United States Patent
Lee et al.

(10) Patent No.: US 12,484,023 B2
(45) Date of Patent: Nov. 25, 2025

(54) METHOD AND APPARATUS FOR SIDELINK RETRANSMISSION IN WIRELESS COMMUNICATION SYSTEM

(71) Applicant: LG Electronics Inc., Seoul (KR)

(72) Inventors: Youngdae Lee, Seoul (KR); Hanbyul Seo, Seoul (KR); Giwon Park, Seoul (KR); Jongyoul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 517 days.

(21) Appl. No.: 17/608,396

(22) PCT Filed: May 4, 2020

(86) PCT No.: PCT/KR2020/005834
§ 371 (c)(1),
(2) Date: Nov. 2, 2021

(87) PCT Pub. No.: WO2020/222591
PCT Pub. Date: Nov. 5, 2020

(65) Prior Publication Data
US 2022/0232523 A1    Jul. 21, 2022

Related U.S. Application Data

(60) Provisional application No. 62/842,487, filed on May 2, 2019.

(51) Int. Cl.
*H04W 72/02* (2009.01)
*H04L 1/08* (2006.01)
(Continued)

(52) U.S. Cl.
CPC ............... *H04W 72/02* (2013.01); *H04L 1/08* (2013.01); *H04L 1/1812* (2013.01); *H04L 5/0053* (2013.01); *H04W 72/0446* (2013.01); *H04W 72/21* (2023.01); *H04W 72/23* (2023.01); *H04W 72/569* (2023.01)

(58) Field of Classification Search
CPC . H04W 72/02; H04W 72/0446; H04W 72/21; H04W 72/23; H04W 72/569;
(Continued)

(56) References Cited

U.S. PATENT DOCUMENTS

2020/0092692 A1 *   3/2020   Wang ................... H04W 76/14
2020/0275474 A1 *   8/2020   Chen .................... H04L 1/1848
(Continued)

FOREIGN PATENT DOCUMENTS

WO    WO2017188698    11/2017

OTHER PUBLICATIONS

Ericsson, "On the Support of HARQ feedbacks Over Sidelink," TDoc R2-1904698, Presented at 3GPP TSG-RAN WG2 #105bis, Xi'An, China, Apr. 8-Apr. 12, 2019, 3 pages.
(Continued)

*Primary Examiner* — Ivan O Latorre
(74) *Attorney, Agent, or Firm* — Fish & Richardson P.C.

(57) ABSTRACT

The present disclosure relates to sidelink retransmission in wireless communications. According to an embodiment of the present disclosure, a method performed by a first wireless device in a wireless communication system comprises: receiving, from a network, sidelink (SL) resources configured with a hybrid automatic repeat request (HARQ) feedback; selecting one or more logical channels only configured with the HARQ feedback; generating a data unit based on the one or more logical channels only configured with the HARQ feedback; and transmitting, to a second wireless device, the data unit based on the SL resources.

15 Claims, 22 Drawing Sheets

(51) Int. Cl.
*H04L 1/1812* (2023.01)
*H04L 5/00* (2006.01)
*H04W 72/0446* (2023.01)
*H04W 72/21* (2023.01)
*H04W 72/23* (2023.01)
*H04W 72/566* (2023.01)

(58) Field of Classification Search
CPC .... H04W 28/0247; H04W 40/22; H04L 1/08; H04L 1/1812; H04L 5/0053; H04L 1/1887; H04L 1/1896; H04L 47/125
See application file for complete search history.

(56) References Cited

U.S. PATENT DOCUMENTS

| | | | | |
|---|---|---|---|---|
| 2020/0367095 A1* | 11/2020 | Pan | ......................... | H04L 1/1874 |
| 2021/0274545 A1* | 9/2021 | Adjakple | .............. | H04W 72/21 |
| 2021/0377912 A1* | 12/2021 | El Hamss | ............. | H04L 1/1854 |
| 2022/0015070 A1* | 1/2022 | Chen | ..................... | H04W 72/23 |
| 2022/0045800 A1* | 2/2022 | Chen | ..................... | H04L 1/1896 |
| 2022/0158776 A1* | 5/2022 | Kang | .................... | H04L 1/1685 |

OTHER PUBLICATIONS

Ericsson, "Transmission of sidelink HARQ feedback to gNB for mode 1 scheduling," R1-1901227, Presented at 3GPP TSG-RAN WG1 Meeting # ah-1901, Taipei, Taiwan, Jan. 21-25, 2019, 4 pages.

Samsung, "MAC PDU Format for NR Sidelink," R2-1903276, Presented at 3GPP TSG-RAN2 105bis, Xian, China, Apr. 8-Apr. 12, 2019, 3 pages.

Spreadtrum Communications, "Discussion on NR sidelink physical layer procedure," R1-1900714, Presented at 3GPP TSG RAN WG1 Ad-Hoc Meeting 1901, Taipei, Jan. 21-25, 2019, 6 pages.

* cited by examiner

FIG. 18

| Requested Number of Retransmission | Oct 1 |

METHOD AND APPARATUS FOR SIDELINK RETRANSMISSION IN WIRELESS COMMUNICATION SYSTEM

CROSS-REFERENCE TO RELATED APPLICATIONS

This application is a National Stage application under 35 U.S.C. § 371 of International Application No. PCT/KR2020/005834, filed on May 4, 2020, which claims the benefit of U.S. Provisional Application No. 62/842,487, filed on May 2, 2019. The disclosures of the prior applications are incorporated by reference in their entirety.

BACKGROUND OF THE DISCLOSURE

Field of the Disclosure

The present disclosure relates to sidelink retransmission in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

User equipments (UEs) in a wireless communication system can communication with each other via a network infrastructure (e.g., RAN node), or via a direct communication link between the UEs. This direct communication link may be referred to as sidelink, and the UEs can perform direct communication with each other.

In a direct communication, a UE may transmit data to another UE. However, this data may be improperly received by the other UE due to various reasons. In this case, the other UE may transmit feedback information to the UE indicating that the data is improperly received by the other UE, for example NACK indication for the data. Likewise, in a direct communication, there may be a case in which the UE may perform a retransmission of the data to the other UE.

SUMMARY OF THE DISCLOSURE

Technical Problem

An aspect of the present disclosure is to provide method and apparatus for sidelink retransmission in a wireless communication system.

Another aspect of the present disclosure is to provide method and apparatus for requesting SL retransmission resources in a wireless communication system.

Another aspect of the present disclosure is to provide method and apparatus for SR and/or BSR for the SL retransmission in a wireless communication system.

Another aspect of the present disclosure is to provide method and apparatus for providing a structure of a retransmission BSR MAC CE in a wireless communication system.

Technical Solution

According to an embodiment of the present disclosure, a method performed by a first wireless device in a wireless communication system comprises: receiving, from a network, sidelink (SL) resources configured with a hybrid automatic repeat request (HARQ) feedback; selecting one or more logical channels only configured with the HARQ feedback; generating a data unit based on the one or more logical channels only configured with the HARQ feedback; and transmitting, to a second wireless device, the data unit based on the SL resources.

According to an embodiment of the present disclosure, a first wireless device in a wireless communication system comprises: a transceiver; a memory; and at least one processor operatively coupled to the transceiver and the memory, and configured to: control the transceiver to receive, from a network, sidelink (SL) resources configured with a hybrid automatic repeat request (HARQ) feedback, select one or more logical channels only configured with the HARQ feedback, generate a data unit based on the one or more logical channels only configured with the HARQ feedback, and control the transceiver to transmit, to a second wireless device, the data unit based on the SL resources.

According to an embodiment of the present disclosure, a processor for a first wireless device in a wireless communication system is configured to control the first wireless device to perform operations comprising: receiving, from a network, sidelink (SL) resources configured with a hybrid automatic repeat request (HARQ) feedback; selecting one or more logical channels only configured with the HARQ feedback; generating a data unit based on the one or more logical channels only configured with the HARQ feedback; and transmitting, to a second wireless device, the data unit based on the SL resources.

Advantageous Effect

The present disclosure can have various advantageous effects.

For example, a UE may identify control information transmissions with different identifiers for a direct link with the other UE, in particular when the UE is connected to the other UE for multiple services. Therefore, it is beneficial in that the system can manage a direct link between two UEs performing sidelink communication for multiple services.

For example, by generating a data unit comprising sidelink data having similar QoS characteristics configured with HARQ feedback, SL transmission can be optimized.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIGS. 16 to 18 show examples of a structure of retransmission BSR MAC CE according to an embodiment of the present disclosure.

DESCRIPTION OF EXEMPLARY EMBODIMENTS

Figure 1:
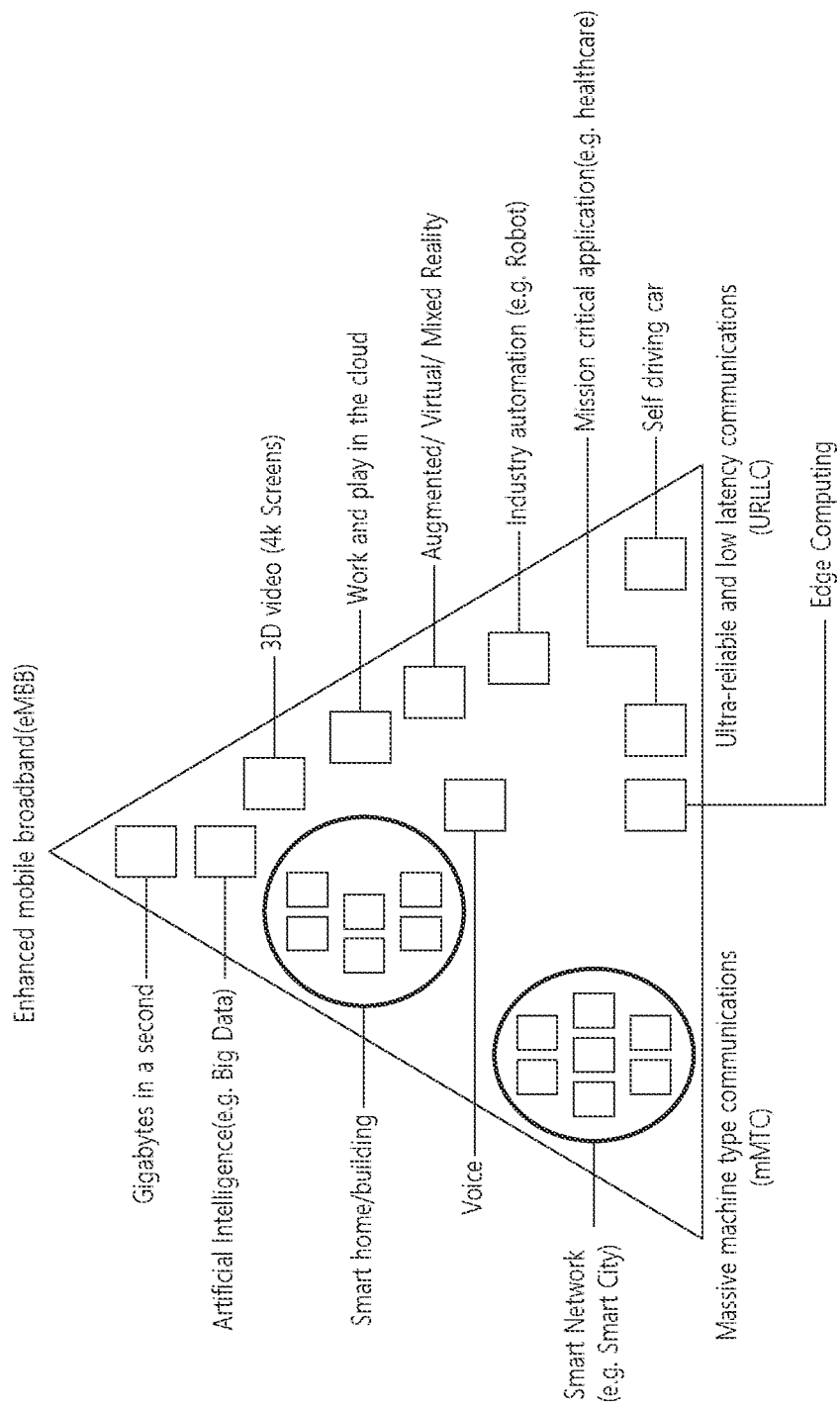
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

'Reference point' refers to a conceptual link defining two functions existing in different functional entities of a radio access network and a core network. 'PC5 reference point' refers to a reference point between V2X supporting UEs for vehicle to vehicle (V2V), vehicle to infrastructure (V2I) and vehicle to pedestrians/motorcyclists/bicyclists (V2P) services.

'UL grant' may correspond to resources used for a UL transmission to a network.

'SL grant' may correspond to resources used for an SL transmission to another UE.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
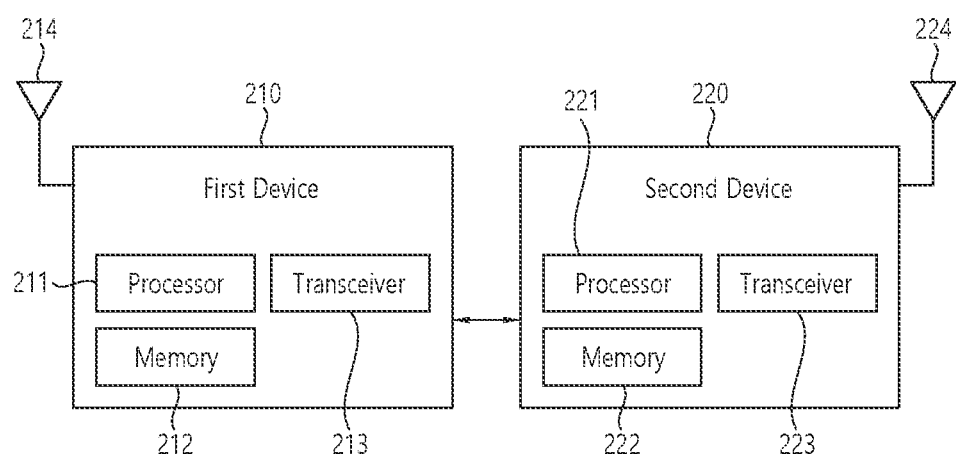
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
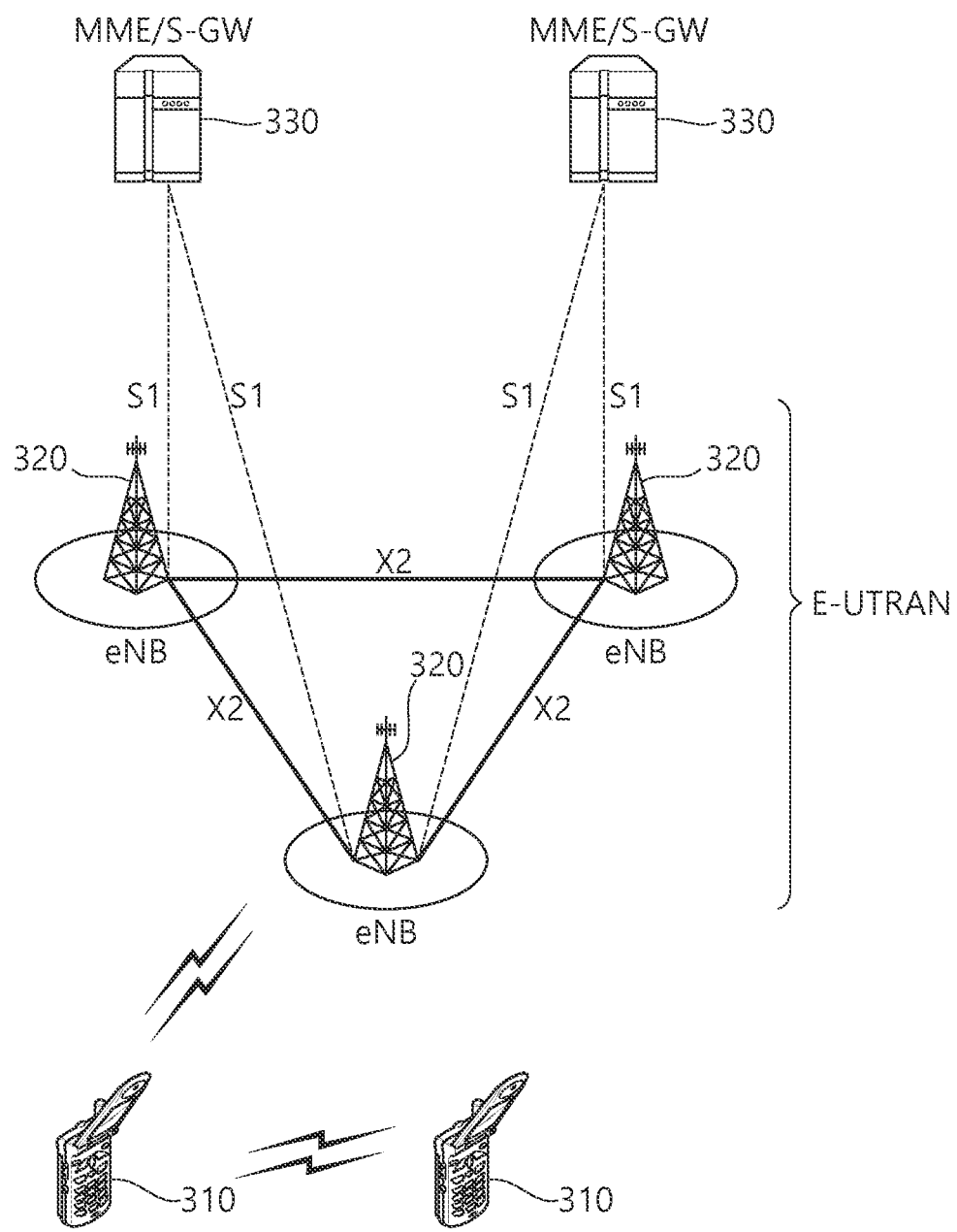
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
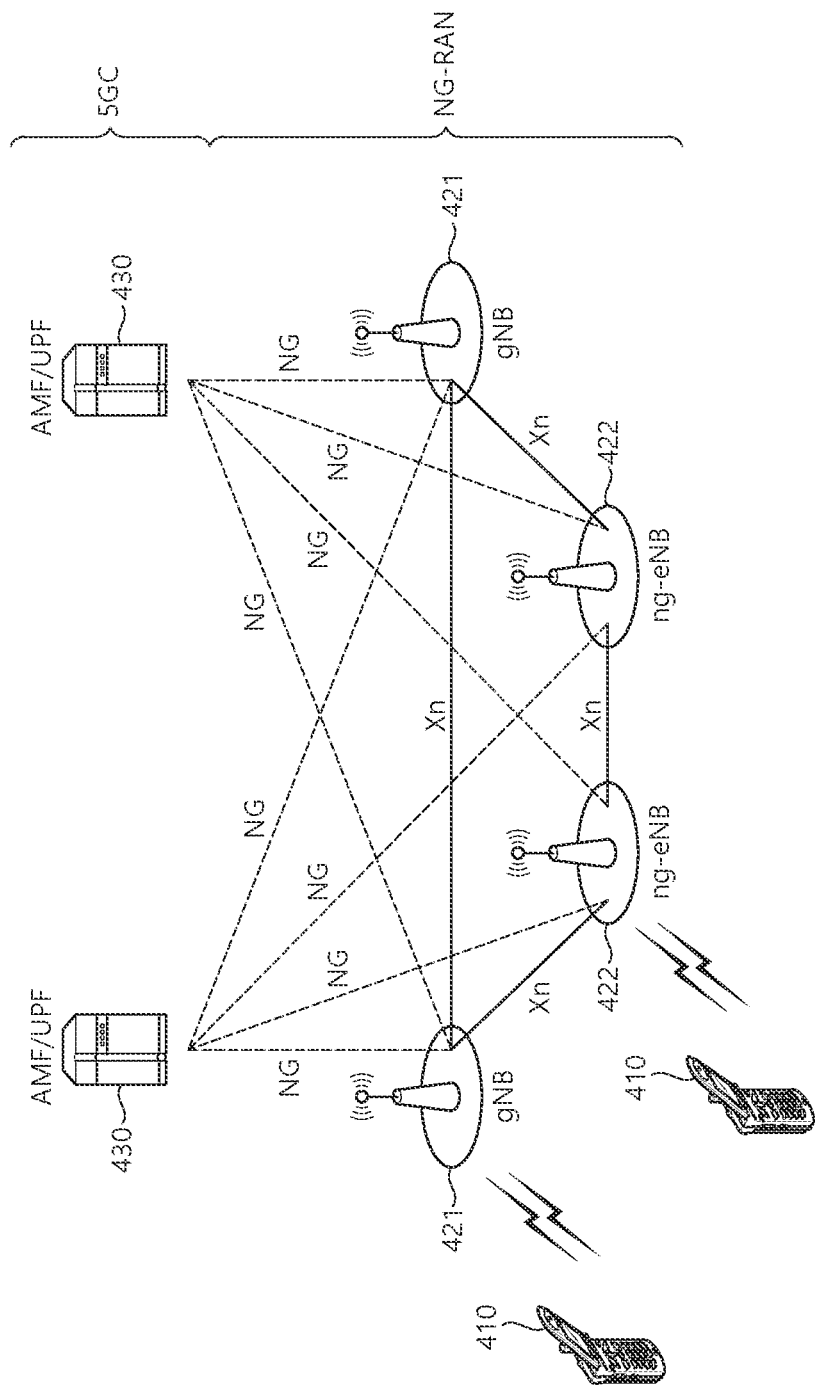
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NW") may absorb some or all of the functions of the entities introduced in FIG. 3 (e.g. eNB, MME, S-GW).

The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
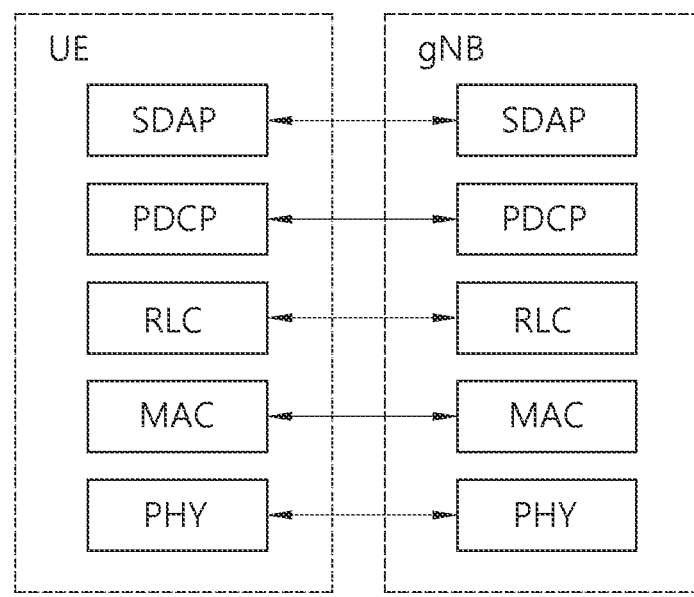
FIG. 5 shows a block diagram of a user plane protocol stack to which the technical features of the present disclosure can be applied.
Figure 6:
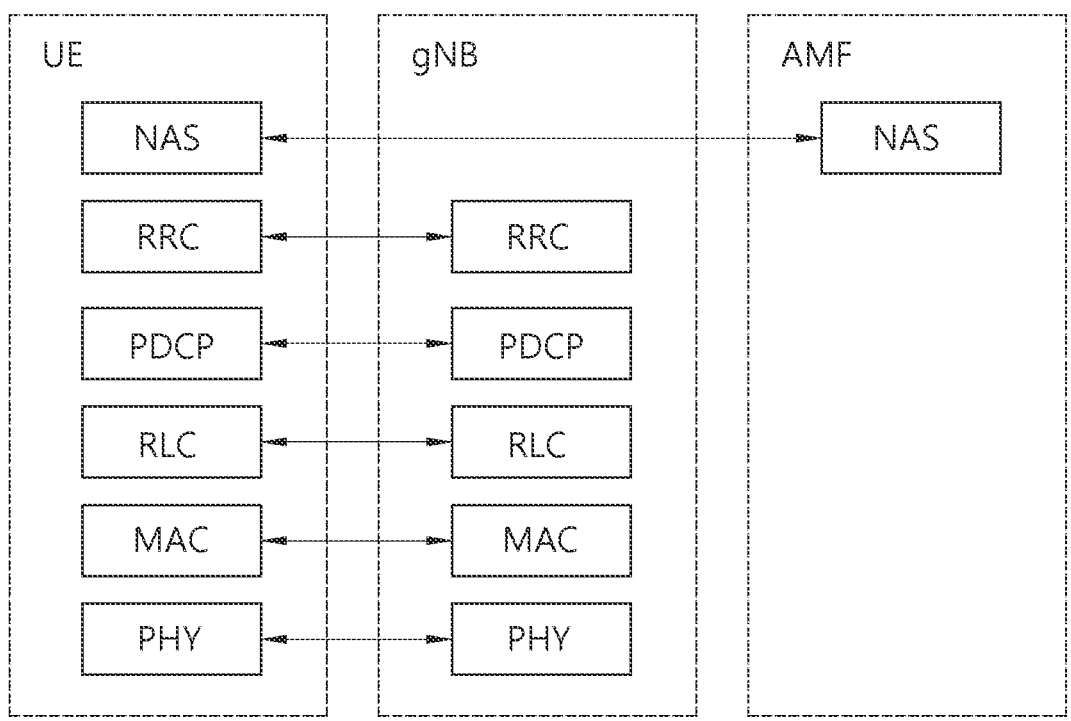
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
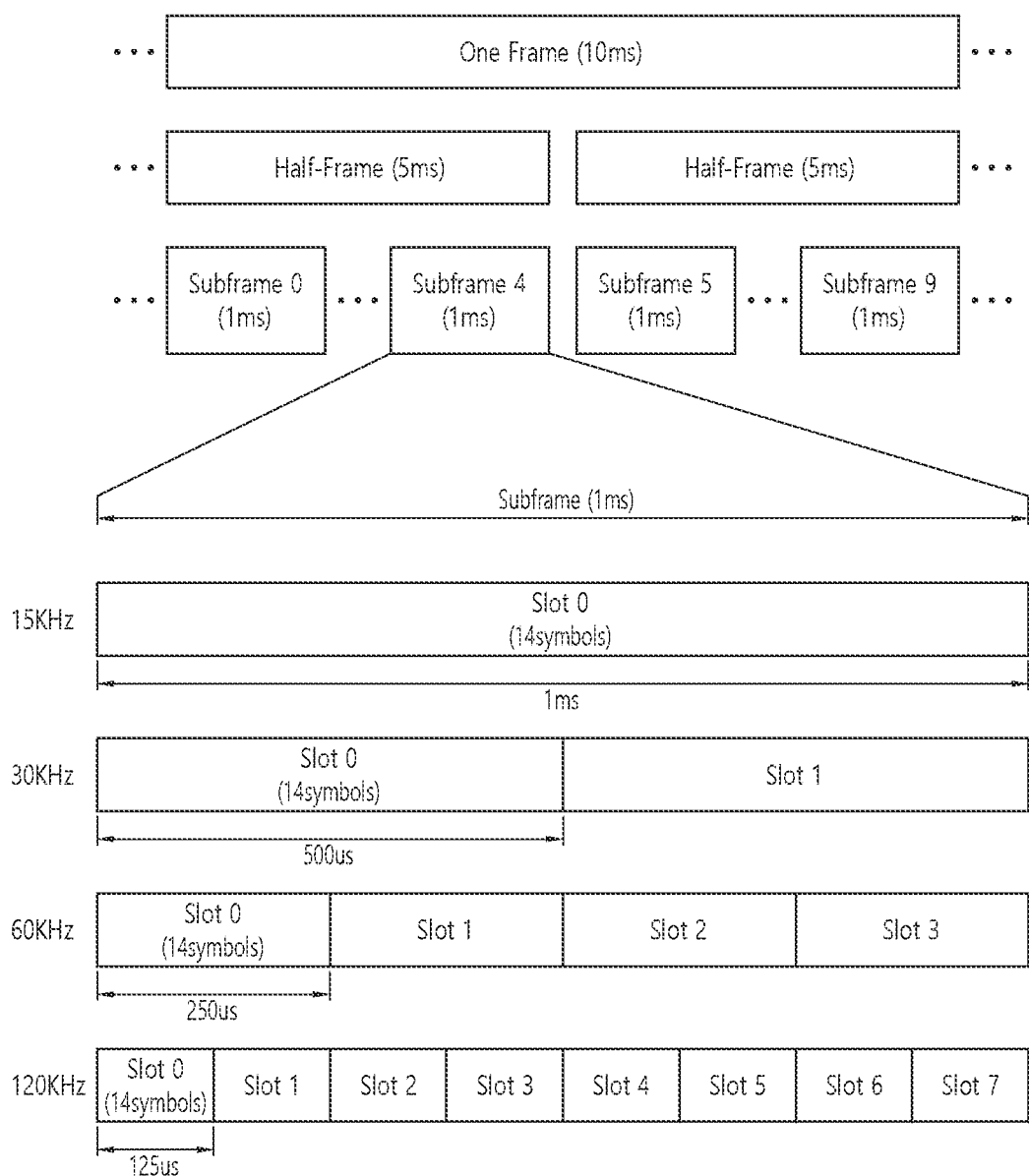
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2u*15$ kHz. The following table shows the number of OFDM symbols per slot, the number of slots per frame, and the number of slots per for the normal CP, according to the subcarrier spacing $\Delta f=2u*15$ kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2u*15$ kHz.

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid,x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
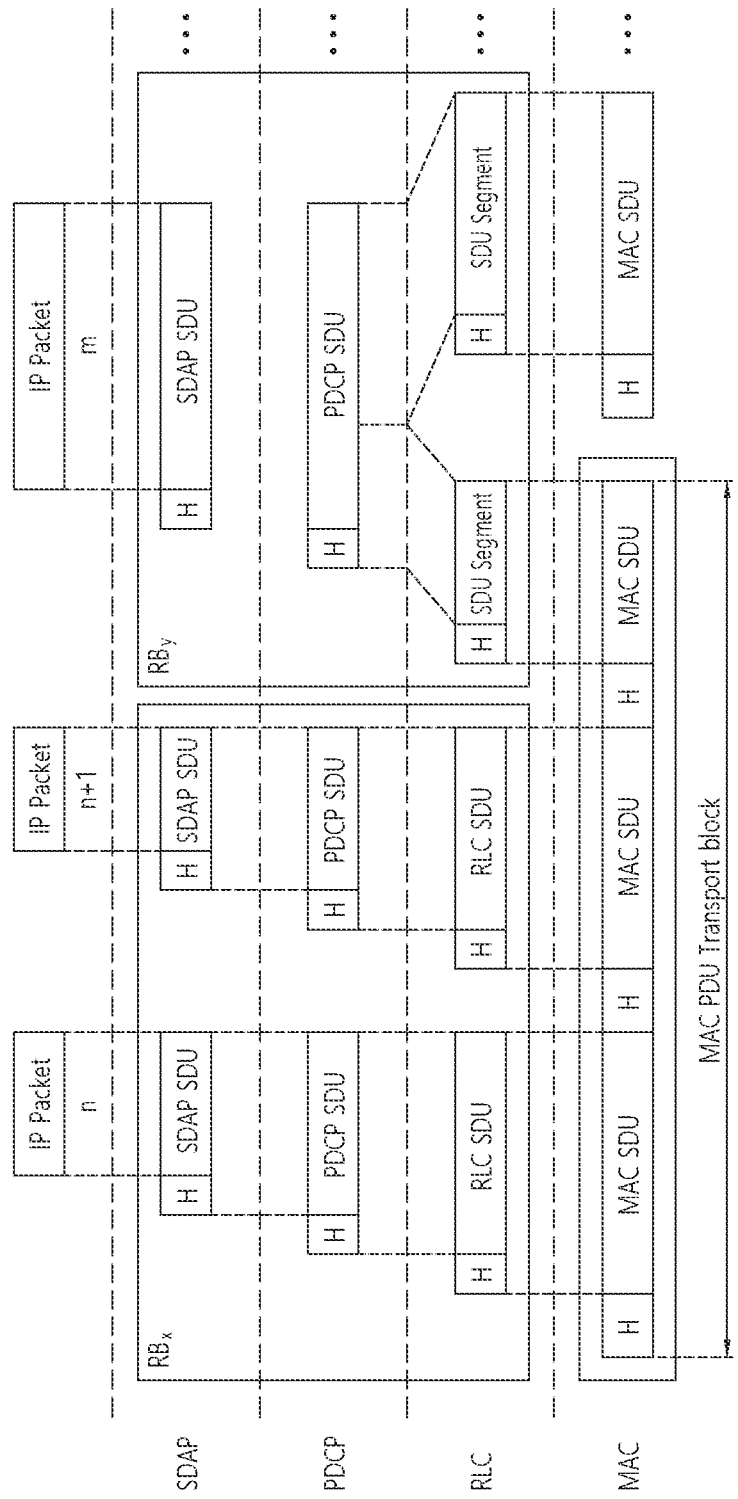
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
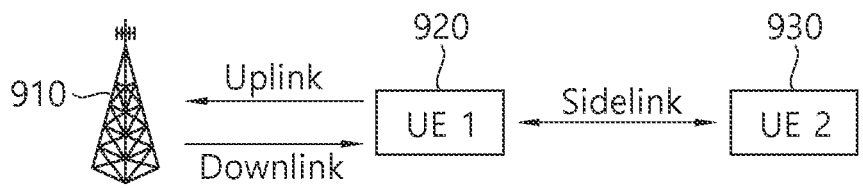
FIG. 9 shows an example of communication links to which technical features of the present disclosure can be applied.

FIG. 9 shows an example of communication links to which technical features of the present disclosure can be applied.

Referring to FIG. 9, the communication links comprise uplink, downlink, and sidelink. The uplink is a communication interface from a UE (e.g., UE 920) to a base station (e.g., base station 910, such as eNB and/or gNB). The downlink is a communication interface from a base station (e.g., base station 910) to a UE (e.g., UE 920).

The sidelink is UE to UE interface for sidelink communication, sidelink discovery and/or vehicle to everything (V2X) communication. For example, the sidelink may correspond to a PC5 interface for sidelink communication, sidelink discovery and/or V2X sidelink communication.

A UE may perform a communication via network infrastructure. For example, as shown in FIG. 9, the UE1 920 may perform an uplink transmission and/or receive a downlink transmission, via the base station 910.

Also, a UE may perform a communication directly with a peer UE without using the network infrastructure. For example, as shown in FIG. 9, the UE1 920 may perform a direct communication with the UE2 930 via sidelink, without a support of the network infrastructure such as base station 910.

According to various embodiments, upper layers configure the UE to receive or transmit sidelink communication on a specific frequency, to monitor or transmit non-public safety (PS) related sidelink discovery announcements on one or more frequencies or to monitor or transmit PS related sidelink discovery announcements on a specific frequency, but only if the UE is authorized to perform these particular proximity service (ProSe) related sidelink activities.

Sidelink communication comprises one-to-many and one-to-one sidelink communication. One-to-many sidelink communication comprises relay related and non-relay related one-to-many sidelink communication. One-to-one sidelink communication comprises relay related and non-relay related one-to-one sidelink communication. In relay related one-to-one sidelink communication the communicating parties comprise one sidelink relay UE and one sidelink remote UE.

Sidelink discovery comprises public safety related (PS related) and non-PS related sidelink discovery. PS related sidelink discovery comprises relay related and non-relay related PS related sidelink discovery. Upper layers indicate to RRC whether a particular sidelink announcement is PS related or non-PS related.

According to various embodiments, upper layers indicate to radio resource control (RRC) whether a particular sidelink procedure is V2X related or not.

According to various embodiments, the UE shall perform V2X sidelink communication operation if at least one of the following conditions 1)-3) is met:

Condition 1) if the UE's serving cell is suitable (RRC_IDLE or RRC_CONNECTED); and if either the selected cell on the frequency used for V2X sidelink communication operation belongs to the registered or equivalent public land mobile network (PLMN) or the UE is out of coverage on the frequency used for V2X sidelink communication operation;

Condition 2) if the UE's serving cell (for RRC_IDLE or RRC_CONNECTED) fulfils the conditions to support V2X sidelink communication in limited service state; and if either the serving cell is on the frequency used for V2X sidelink communication operation or the UE is out of coverage on the frequency used for V2X sidelink communication operation; or Condition 3) if the UE has no serving cell (RRC_IDLE).

Figure 10:
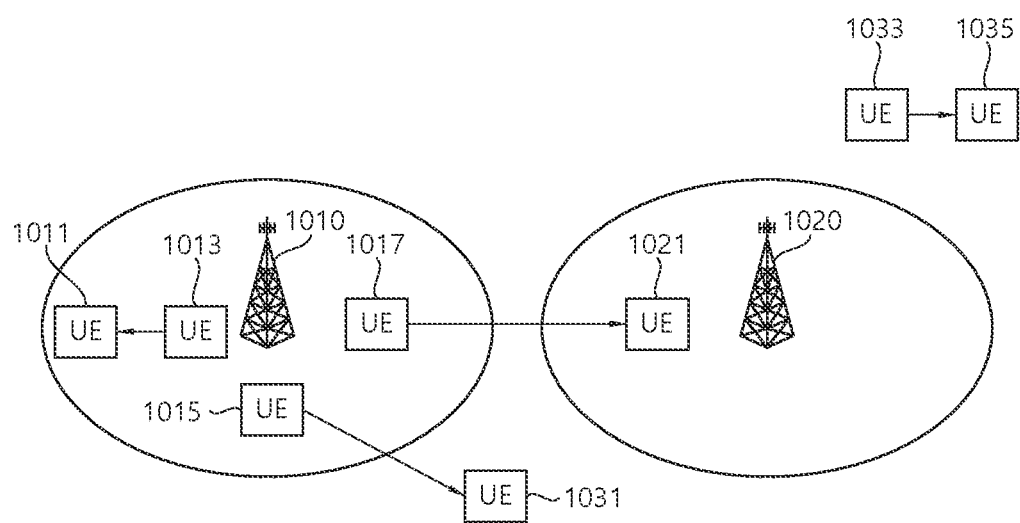
FIG. 10 shows an example of sidelink connectivity types to which technical features of the present disclosure can be applied.

FIG. 10 shows an example of sidelink connectivity types to which technical features of the present disclosure can be applied.

Referring to FIG. 10, a sidelink connectivity between UE 1011 and UE 1013 may be "in-coverage", where the two UEs UE 1011 and UE 1013 are under a coverage of a network (e.g., base station 1010). Also, the sidelink connectivity between the UE 1011 and the UE 1013 may be in-coverage of intra-cell type, as the UE 1011 receiving a sidelink transmission is within a same cell as the UE 1013 transmitting the sidelink transmission.

A sidelink connectivity between UE 1017 and UE 1021 may be also in-coverage, as the two UEs 1017 and 1021 are under a coverage of a network. However, unlike the case of the UE 1011 and the UE 1013, the sidelink connectivity between the UE 1017 and the UE 1021 may be in-coverage of inter-cell type, as the UE 1021 receiving a sidelink transmission is within a cell coverage of a base station 1020 while the UE 1017 transmitting the sidelink transmission is within a cell coverage of a base station 1010.

A sidelink connectivity between UE 1015 and UE 1031 may be "partial-coverage", where one of the two UEs (e.g., UE 1015) is under a coverage of a network while the other UE (e.g., UE 1031) is outside the coverage of the network.

A sidelink connectivity between UE 1033 and UE 1035 may be "out-of-coverage", where the two UEs UE 1033 and UE 1035 are outside a coverage of a network.

Figure 11:
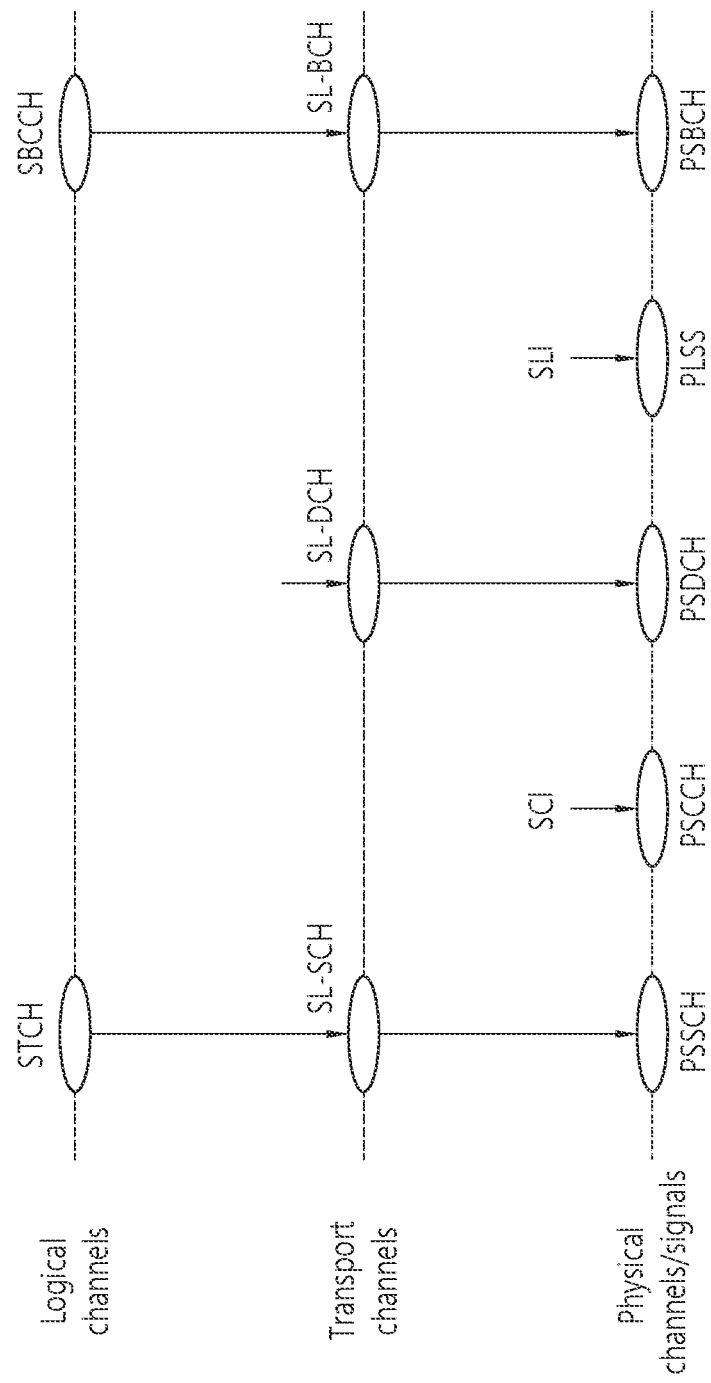
FIG. 11 shows an example of sidelink channel mapping to which technical features of the present disclosure can be applied.

FIG. 11 shows an example of sidelink channel mapping to which technical features of the present disclosure can be applied.

Referring to FIG. 11, sidelink logical channels may comprise sidelink traffic channel (STCH) and sidelink broadcast control channel (SBCCH). Sidelink transport channels may comprise sidelink shared channel (SL-SCH), sidelink discovery channel (SL-DCH), and sidelink broadcast channel (SL-BCH). Sidelink physical channels and/or signals may comprise physical sidelink shared channel (PSSCH), physical sidelink control channel (PSCCH), physical sidelink discovery channel (PSDCH), sidelink synchronization signal (SLSS), and physical sidelink broadcast channel (PSBCH).

The STCH carries user data for sidelink communication. The STCH is mapped to the SL-SCH which, in turn, is mapped to the PSSCH.

The PSCCH carries sidelink control information (SCI). The SCI contains sidelink scheduling information such as resource block assignment, modulation and coding scheme, and/or group destination ID.

The SL-DCH is used for discovery announcements. The SL-DCH is mapped to the PSDCH.

The SLSS is a physical signal, which is used to synchronize a sidelink communication between UE and peer UE. The SLSS is associated with a specific sidelink identity (SLI).

The SBCCH is mapped to the SL-BCH which, in turn, is mapped to the PSBCH. These channels are also used for sidelink synchronization, and comprise sidelink related system information. For example, the sidelink related system information may be referred to as sidelink master information block (SL-MIB).

Although not illustrated in FIG. 11, there might be other channel(s) such as sidelink feedback channel (SL-FCH) and/or physical sidelink feedback channel (PSFCH). These channels are used to carry sidelink feedback control information (SFCI) from a device receiving a sidelink transmission.

Figure 12:
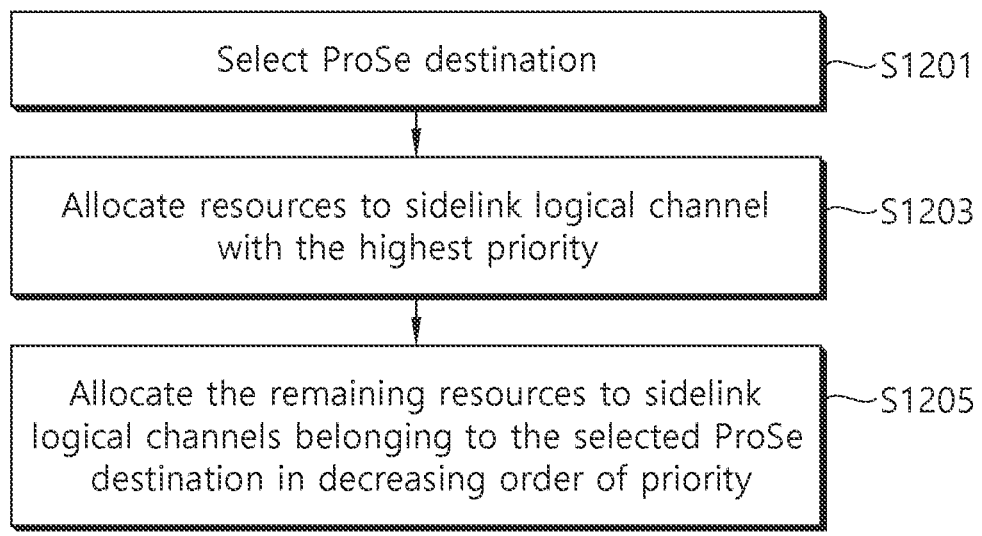
FIG. 12 shows an example of a method for logical channel prioritization (LCT) in a sidelink communication to which technical features of the present disclosure can be applied.

FIG. 12 shows an example of a method for logical channel prioritization (LCT) in a sidelink communication to which technical features of the present disclosure can be applied.

The LCP procedure may be applied when a new transmission is performed. Each sidelink logical channel may have an associated priority which may be the proximity service (ProSe) per packet priority (PPPP) and optionally an associated ProSe per packet reliability (PPPR). Multiple sidelink logical channels may have the same associated priority. The mapping between priority and LCID may be left for UE implementation. If duplication is activated, the MAC entity shall map different sidelink logical channels which correspond to the same PDCP entity onto different carriers, or onto different carriers of different carrier sets (if configured in allowedCarrierFreqList for the corresponding destination). For a given sidelink logical channel, it is up to UE implementation which carrier set to select among the carrier sets configured in allowedCarrierFreqList (if configured) for the corresponding destination.

The MAC entity shall perform Logical Channel Prioritization procedure either for each SCI transmitted in a sidelink control (SC) period in sidelink communication, or for each SCI corresponding to a new transmission in V2X sidelink communication.

When the MAC entity allocates resources to the sidelink logical channels, the MAC entity shall:
  Consider sidelink logical channels not previously selected for this SC period and the SC periods (if any) which are overlapping with this SC period, to have data available for transmission in sidelink communication;
  Consider sidelink logical channels which are allowed on the carrier where the SCI is transmitted for V2X sidelink communication, if the carrier is configured by upper layers, and/or which have a priority whose associated threshCBR-FreqReselection is no lower than the CBR of the carrier when the carrier is (re-)selected.
  Consider one sidelink logical channel among sidelink logical channels corresponding to same PDCP entity, if duplication is activated.

Hereinafter, detailed LCP procedure is described. Steps are illustrated in FIG. 12 to describe the LCP procedure.

Referring to FIG. 12, in step S1201, the MAC entity may select a ProSe destination, having the sidelink logical channel with the highest priority, among the sidelink logical channels having data available for transmission and having the same transmission format as the one selected corresponding to the ProSe Destination. The sidelink logical channels belonging to the same ProSe Destination may have the same transmission format.

For each MAC PDU associated to the SCI, in step S1203, the MAC entity may, among the sidelink logical channels belonging to the selected ProSe Destination and having data available for transmission, allocate resources to the sidelink logical channel with the highest priority.

If any resources remain, in step S1205, sidelink logical channels belonging to the selected ProSe Destination may be served in decreasing order of priority until either the data for the sidelink logical channel(s) or the SL grant is exhausted, whichever comes first. Sidelink logical channels configured with equal priority should be served equally.

The UE shall also follow the rules 1)~4) below during the scheduling procedures:
  1) The UE should not segment an RLC SDU (or partially transmitted SDU) if the whole SDU (or partially transmitted SDU) fits into the remaining resources;
  2) If the UE segments an RLC SDU from the sidelink logical channel, the UE shall maximize the size of the segment to fill the grant as much as possible;
  3) The UE should maximise the transmission of data;
  4) If the MAC entity is given a sidelink grant size that is equal to or larger than 10 bytes (for sidelink communication) or 11 bytes (for V2X sidelink communication) while having data available for transmission, the MAC entity shall not transmit only padding.

Hereinafter, identifiers (IDs) for sidelink communication over PC5 reference point is described.

Each UE may have one or more layer-2 IDs for V2X communication over PC5 reference point, comprising at least one of:
  Source Layer-2 ID(s)(simply "source ID hereinafter); or
  Destination Layer-2 ID(s)(simply "destination ID hereinafter).

Source and destination Layer-2 IDs may be included in layer-2 frames sent on the layer-2 link of the PC5 reference point identifying the layer-2 source and destination of these frames. Source Layer-2 IDs may be self-assigned by the UE originating the corresponding layer-2 frames.

The selection of the source and destination Layer-2 ID(s) by a UE may depend on the communication mode of V2X communication over PC5 reference point for this layer-2 link. The source Layer-2 IDs may differ between different communication modes.

When IP-based V2X communication is supported, the UE may configure a link local IPv6 address to be used as the source IP address. The UE may use this IP address for V2X communication over PC5 reference point without sending Neighbour Solicitation and Neighbour Advertisement message for Duplicate Address Detection.

If the UE has an active V2X application that requires privacy support in the current Geographical Area as identified by configuration, in order to ensure that a source UE (e.g. vehicle) cannot be tracked or identified by any other UEs (e.g. vehicles) beyond a certain short time-period required by the application, the source Layer-2 ID shall be changed over time and shall be randomized. For IP-based V2X communication over PC5 reference point, the source IP address shall also be changed over time and shall be randomized. The change of the identifiers of a source UE must be synchronized across layers used for PC5, e.g. when the application layer identifier changes, the source Layer-2 ID and the source IP address may need to be changed.

The IDs for V2X communication may comprise at least one of 1) IDs for broadcast mode V2X communication over PC5 reference point, 2) IDs for groupcast mode V2X communication over PC5 reference point, or 3) IDs for unicast mode V2X communication over PC5 reference point.

1) IDs for Broadcast Mode V2X Communication Over PC5 Reference Point

For broadcast mode of V2X communication over PC5 reference point, the UE may be configured with the destination Layer-2 ID(s) to be used for V2X services.

The UE may self-select a source Layer-2 ID. The UE may use different source Layer-2 IDs for different types of PC5 reference points, i.e. LTE based PC5 and NR based PC5.

2) IDs for Groupcast Mode V2X Communication Over PC5 Reference Point.

For groupcast mode of V2X communication over PC5 reference point, the V2X application layer may provide group identifier information. When the group identifier information is provided by the V2X application layer, the UE may convert the provided group identifier into a destination Layer-2 ID. When the group identifier information is not provided by the V2X application layer, the UE may determine the destination Layer-2 ID based on configuration of the mapping between service type (e.g. PSID/ITS-AID) and Layer-2 ID. The UE may self-select a source Layer-2 ID.

3) IDs for Unicast Mode V2X Communication Over PC5 Reference Point

For unicast mode of V2X communication over PC5 reference point, the destination Layer-2 ID used may depend on the communication peer, which is discovered during the establishment of the unicast link. The initial signalling for the establishment of the unicast link may use a default destination Layer-2 ID associated with the service type (e.g. PSID/ITS-AID) configured for unicast link establishment. During the unicast link establishment procedure, Layer-2 IDs may be exchanged, and should be used for future communication between the two UEs.

The UE may need to maintain a mapping between the application layer identifiers and the source Layer-2 IDs used for the unicast links, as the V2X application layer does not use the Layer-2 IDs. This may allow the change of source Layer-2 ID without interrupting the V2X applications.

When application layer identifiers changes, the source Layer-2 ID(s) of the unicast link(s) shall be changed if the link(s) was used for V2X communication with the changed application layer identifiers.

A UE may establish multiple unicast links with a peer UE and use the same or different source Layer-2 IDs for these unicast links.

Hereinafter, sidelink hybrid automatic repeat request (HARQ) operation is described. In detail, 1) Sidelink HARQ entity, and 2) Sidelink (HARQ) process are described.

1) Sidelink HARQ Entity

The MAC entity may be configured by upper layers to transmit using pool(s) of resources on one or multiple carriers. For each carrier, there may be one sidelink HARQ entity at the MAC entity for transmission on SL-SCH, which maintains a number of parallel sidelink processes.

For a sidelink communication, the number of transmitting sidelink processes associated with the sidelink HARQ Entity is defined such that, if a higher layer parameter commMultipleTx-r13 is set to supported, then the UE may support 8 transmitting sidelink processes.

For V2X sidelink communication, the maximum number of transmitting Sidelink processes associated with each Sidelink HARQ Entity is 8. A sidelink process may be configured for transmissions of multiple MAC PDUs. For transmissions of multiple MAC PDUs, the maximum number of transmitting Sidelink processes associated with each Sidelink HARQ Entity is 2.

A delivered and configured sidelink grant and its associated HARQ information may be associated with a sidelink process.

For each subframe of the SL-SCH and each sidelink process, the sidelink HARQ Entity shall:
1> if a sidelink grant corresponding to a new transmission opportunity has been indicated for this Sidelink process and there is SL data, for sidelink logical channels of proximity service (ProSe_destination associated with this sidelink grant, available for transmission:
2> obtain the MAC PDU from the "Multiplexing and assembly" entity;
2> deliver the MAC PDU and the sidelink grant and the HARQ information to this sidelink process;
2> instruct this Sidelink process to trigger a new transmission.
1> else, if this subframe corresponds to retransmission opportunity for this Sidelink process:
2> instruct this sidelink process to trigger a retransmission.

2) Sidelink Process

The Sidelink process may be associated with a HARQ buffer.

The sequence of redundancy versions may be 0, 2, 3, 1. The variable CURRENT_IRV may be an index into the sequence of redundancy versions. This variable may be updated modulo 4.

New transmissions and retransmissions either for a given sidelink control (SC) period in sidelink communication or in V2X sidelink communication may be performed on the resource indicated in the sidelink grant.

If the sidelink process is configured to perform transmissions of multiple MAC PDUs for V2X sidelink communication, the sidelink process may maintain a counter SL_RESOURCE_RESELECTION_COUNTER. For other configurations of the sidelink process, this counter may not be available.

If the sidelink HARQ entity requests a new transmission, the sidelink process shall:
set CURRENT_IRV to 0;
store the MAC PDU in the associated HARQ buffer;
store the sidelink grant received from the Sidelink HARQ Entity;
generate a transmission as described below.

If the sidelink HARQ entity requests a retransmission, the Sidelink process shall:
generate a transmission as described below.

To generate a transmission, the sidelink process shall:
1> if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and 1> if there is no Sidelink Discovery Gap for Transmission or no transmission on PSDCH at the time of the transmission; or, in case of transmissions of V2X sidelink communication, if the MAC entity is able to perform transmissions on SL-SCH and transmissions on PSDCH simultaneously at the time of the transmission:

2> instruct the physical layer to generate a transmission according to the stored sidelink grant with the redundancy version corresponding to the CURRENT_IRV value.

2> increment CURRENT_IRV by 1;

1> if this transmission corresponds to the last transmission of the MAC PDU:

2> decrement SL_RESOURCE_RESELECTION_COUNTER by 1, if available.

The transmission of the MAC PDU for V2X sidelink communication may be prioritized over uplink transmissions if the following conditions i)~iii) are met:

i) the MAC entity is not able to perform all uplink transmissions and all transmissions of V2X sidelink communication simultaneously at the time of the transmission; and ii) uplink transmission is not prioritized by upper layer; and iii) the value of the highest priority of the sidelink logical channel(s) in the MAC PDU is lower than thresSL-TxPrioritization if thresSL-TxPrioritization is configured.

In a sidelink communication, a UE may perform HARQ retransmissions based on HARQ feedback from the other UE. When a network allocates SL resources, the network may not know whether HARQ retransmission needs to be performed because HARQ feedback is sent to the UE, not the network. Thus, the mechanism for requesting HARQ retransmission resource needs to be supported.

Therefore, according to various embodiments, a first UE may transmit a scheduling request (SR) on PUCCH for a SR configuration corresponding to a logical channel having SL data available for transmission to the network, and then receive a SL resource from the network for a transmission of a MAC PDU to the second UE.

The MAC PDU may carry at least SL data of the logical channel.

The first UE may start a timer upon transmission of the SR, reception of the SL resource or the transmission of the MAC PDU.

Upon detection of a condition for retransmission of the MAC PDU, when there is no SL grant valid for the retransmission and the timer is running, and if there is no UL grant, the first UE may transmit an SR on a PUCCH resource for the SR configuration to the network.

If a PUCCH resource is overlapped with other transmission, this SR may be not transmitted on the PUCCH resource.

If there is no PUCCH resource while the timer is running, the first UE may skip this retransmission.

Different SR configurations (or different PUCCH resources) can be configured for different numbers of retransmissions of the MAC PDU.

The condition for retransmission may comprise at least one of a case when HARQ ACK is not received for the previous transmission, or the case when the UE does not perform HARQ retransmissions up to the maximum number If there is a UL grant, the first may UE transmit a MAC control element (MAC CE) indicating SL-RNTI and the number of requested retransmissions for request of SL grant(s) for the retransmission(s). The MAC CE may comprise a buffer status reporting (BSR) MAC CE.

If the value of the highest priority of the logical channels associated with the MAC PDU is lower than a threshold, the MAC CE may have a higher priority than UL data. Else, if the value of the highest priority of the logical channels associated with the MAC PDU is greater than or equal to the threshold, the MAC CE may have a lower priority than UL data.

Upon receiving a SL grant for retransmission, the UE may perform a retransmission of the MAC PDU based on the SL grant.

Figure 13:
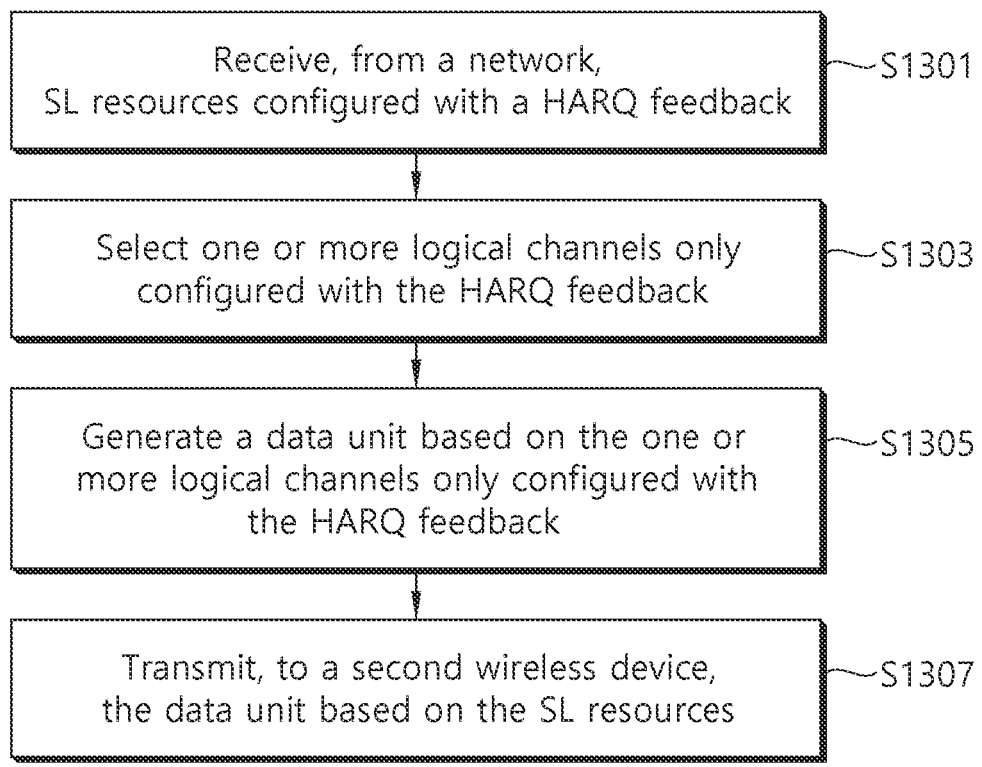
FIG. 13 shows an example of a method for a transmission of a data unit in a sidelink according to an embodiment of the present disclosure.

FIG. 13 shows an example of a method for a transmission of a data unit in a sidelink according to an embodiment of the present disclosure. Steps illustrated in FIG. 13 may be performed by a wireless device and/or a UE.

Referring to FIG. 13, in step S1301, the first wireless device may receive, from a network, SL resources configured with a HARQ feedback. For example, the first wireless device may transmit SL BSR to the network, and receive the SL resources as a response.

In step S1303, the first wireless device may select one or more logical channels only configured with the HARQ feedback. The first wireless device may not select other logical channels not configured with the HARQ feedback.

In step S1305, the first wireless device may generate a data unit based on the one or more logical channels only configured with the HARQ feedback. The data unit may comprise MAC PDU.

In step S1307, the first wireless device may transmit, to a second wireless device, the data unit based on the SL resources. The first wireless device may transmit the data unit using resources corresponding to SL grant.

According to various embodiments, the first wireless device may start a timer (i.e., ReTX SR Allowed Timer) upon receiving the SL resources. The timer may correspond to a time period (i.e., running duration of the timer) during which a transmission of a scheduling request (SR) for requesting an uplink (UL) grant for a retransmission buffer status report (BSR) is allowed. The retransmission BSR may indicate an amount of SL data available for a retransmission in a SL buffer of the first wireless device.

According to various embodiments, the first wireless device may receive, from the second wireless device, a negative acknowledge (NACK) for the data unit. The first wireless device may, after receiving the NACK, identify that SL resources for a retransmission of the data unit and the UL grant for the retransmission BSR are unavailable, and a physical uplink control channel (PUCCH) resource for the SR is available while the timer is running. The first wireless device may transmit, to the network, the SR for requesting the UL grant for the retransmission BSR, on the PUCCH resource.

According to various embodiments, the SR may not transmitted on the PUCCH resource based on that the PUCCH resource is overlapped with other transmissions.

According to various embodiments, the first wireless device may receive, from the second wireless device, a negative acknowledge (NACK) for the data unit. After receiving the NACK, the first wireless device may identify that SL resources for a retransmission of the data unit, the UL grant for the retransmission BSR, and a physical uplink control channel (PUCCH) resource for the SR are unavailable while the timer is running. The first wireless device may skip the retransmission of the data unit.

According to various embodiments, the first wireless device may receive, from the second wireless device, a negative acknowledge (NACK) for the data unit. After receiving the NACK, the first wireless device may identify that SL resources for a retransmission of the data unit is unavailable and the UL grant for the retransmission BSR is available while the timer is running. The first wireless device may transmit, to the network based on the UL grant, the retransmission BSR for requesting the SL resources for the retransmission.

According to various embodiments, the first wireless device may receive, from the network, the SL resources for the retransmission. The first wireless device may perform the retransmission of the data unit to the second wireless device based on the SL resources.

According to various embodiments, a priority of the retransmission BSR may be higher than that of UL data in the UL grant based on that a highest priority of the one or more logical channels is lower than a threshold. A priority of the retransmission BSR may be lower than that of the UL data in the UL grant based on that the highest priority of the one or more logical channels is higher than or equal to the threshold.

According to various embodiments, the threshold may be configured or signalled from the network to the first wireless device via at last one of downlink control information (DCI), media access control (MAC) control element (MAC CE), or a radio resource control (RRC) signalling (i.e., higher layer signalling).

According to various embodiments, the retransmission BSR may indicate SL-radio network temporary identifier (RNTI) allocated to the first wireless device.

According to various embodiments, the retransmission BSR may indicate previous SL resources received for a new transmission or a previous retransmission.

According to various embodiments, the retransmission BSR may indicate a requested number of HARQ retransmissions.

Figure 14:
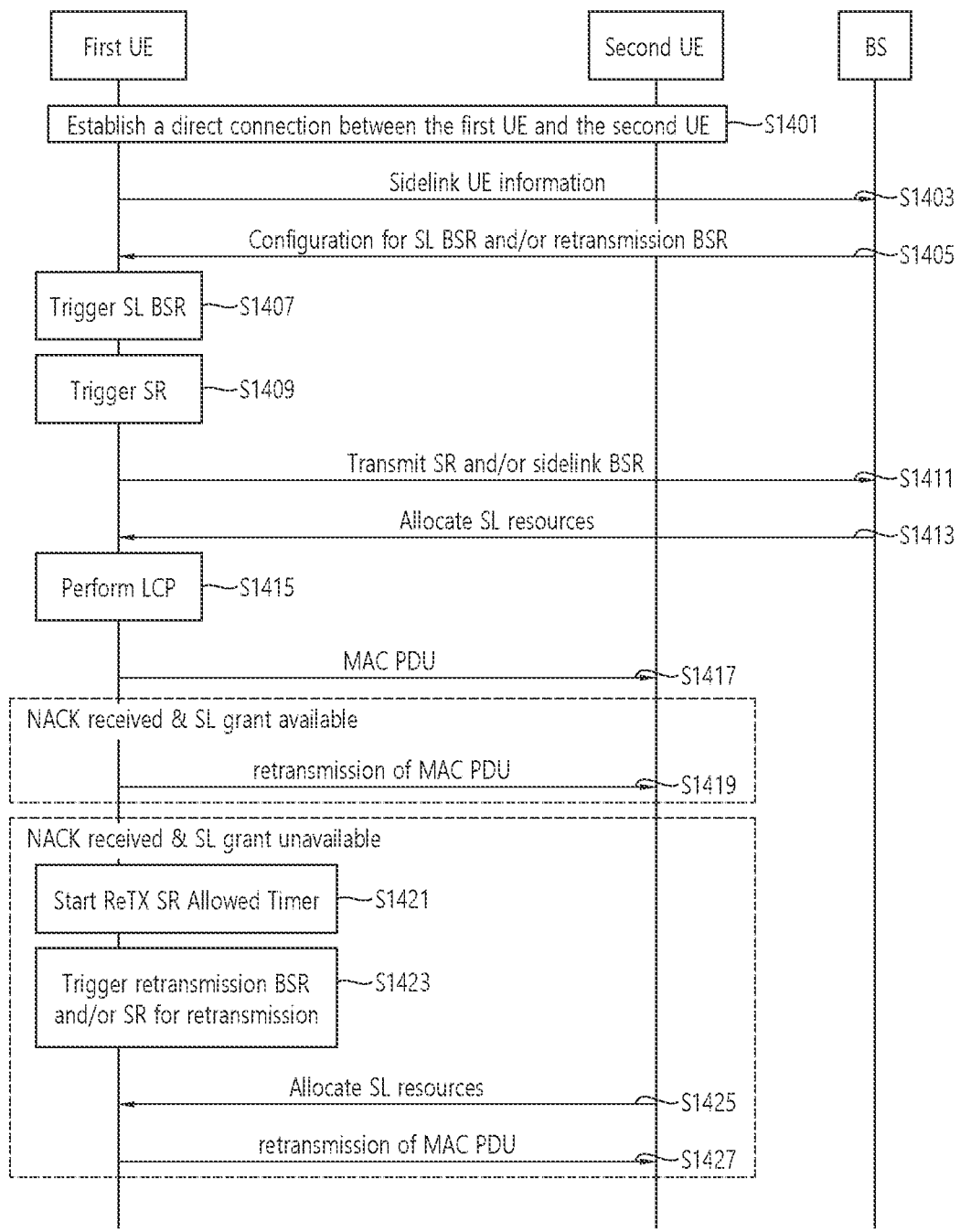
FIG. 14 shows an example of a signal flow for a sidelink retransmission procedure according to an embodiment of the present disclosure.

FIG. 14 shows an example of a signal flow for a sidelink retransmission procedure according to an embodiment of the present disclosure.

Referring to FIG. 14, in step S1401, the first UE may establish a direct link connection with the second UE and allocate a PC5 link identifier (link ID) to the direct link connection. If the direct link is established for unicast type of sidelink communication, the first UE may indicate the allocated link ID to the second UE.

If the first UE establishes another direct link connection with the third UE, the first UE may allocate another link ID to another direct link connection with the third UE. The PC5 link ID may be a unique value within the UE and/or the direct link connection.

The link ID may be associated with one or more destination IDs or one or more services used by the first UE.

In step S1403, The first UE may transmit sidelink UE information to a serving base station (BS). The first UE may inform the serving BS about one or more link IDs. The BS may indicate which a priority, a QoS parameter value, a logical channel or a sidelink radio bearer (SLRB) is configured for HARQ feedback and, if configured, how many HARQ retransmissions (e.g. maximum number) can be performed for a priority, a QoS parameter value, a logical channel or a SLRB. For this purpose, the first UE can indicate how many retransmissions should be performed for each link ID, and/or each logical channel for each link ID.

The UE may also inform the base station about one or more traffic patterns associated with each of the indicated link IDs. Each traffic pattern may be mapped to each LCID (Logical Channel ID), each Sidelink Radio Bearer (SLRB) or each QoS value (e.g. PQI value) of the indicated Link ID.

In step S1405, upon receiving the information (e.g., sidelink UE information) from the first UE, the serving BS may configure a SL BSR and a retransmission BSR for the first UE. The SL BSR may indicate the Link Index mapped to the Link ID and the amount of sidelink data available for transmission in the SL buffers for the Link ID. The retransmission BSR may be a kind of SL BSR, which may indicate a link index mapped to the link ID and the amount of sidelink data available for retransmission in the SL buffers for the link ID. In this configuration, the Link IDs indicated by the first UE may be allocated with Link Indexes. One or more Link IDs may be mapped to one Link Index. One or more sidelink logical channels may be mapped to one Link ID.

In step S1407, if data is available for transmission among sidelink logical channels associated with the Link ID for the direct link connection, the UE may trigger a SL BSR.

For PC5 sidelink transmission, the SL BSR may include one or more sets of a Link Index, one or more Logical Channel Group (LCG), and/or one or more Buffer Sizes for different LCGs. Namely, Destination Index may be replaced by Link Index for unicast.

Alternatively, the SL BSR may include one or more sets of a Link Index, one or more Destination Index, one or more Logical Channel Group (LCG) for different Destination Index, and/or one or more Buffer Sizes for different LCGs.

For PC5 groupcast or broadcast transmission, the SL BSR may include one or more sets of a Destination Index, one or more Logical Channel Group (LCG), and/or one or more Buffer Sizes for different LCGs. The Destination Index may be mapped to one or more Destination IDs.

In step S1409, if UL grant is not configured, the UE may trigger the scheduling request (SR) for requesting sidelink control information (SCI) resources, SL-SCH resources and/or SL HARQ feedback resources for new transmission.

The MAC entity may be configured with zero, one, or more SR configurations for a destination ID or a link ID. An SR configuration may comprise a set of PUCCH resources for SR across different bandwidth parts (BWPs) and/or cells. For a sidelink logical channel, at most one PUCCH resource for SR may be configured per BWP.

Each SR configuration may corresponds to one or more sidelink logical channels. Each sidelink logical channel may be mapped to zero or one SR configuration, which is configured by RRC. The SR configuration of the sidelink logical channel that triggered the SL BSR (if such a configuration exists) may be considered as corresponding SR configuration for the triggered SR.

The first UE may be configured with the following parameters for the SR procedure via RRC signalling (i.e., RRC configures the following parameters for the scheduling request procedure):

sr-ProhibitTimer (per SR configuration);
sr-TransMax (per SR configuration).

Each parameter value may be associated with each priority or each QoS parameter value (e.g., PQI value). The first UE may use a timer value of a priority or a QoS parameter value associated with the highest priority or the highest (or the lowest) QoS parameter value of a destination ID or a Link ID.

The UE variable "SR_COUNTER" per SR configuration may be used for the scheduling request procedure.

If an SR is triggered and there are no other SRs pending corresponding to the same SR configuration, the MAC entity shall set the SR_COUNTER of the corresponding SR configuration to 0.

When an SR is triggered for a destination ID or a Link ID, the SR shall be considered as pending until the SR is cancelled.

All pending SR(s) triggered prior to assembly of the MAC PDU shall be cancelled for the destination ID or the link ID and each respective sr-ProhibitTimer shall be stopped for the destination ID or the link ID when the MAC PDU is transmitted and the MAC PDU includes a sidelink BSR MAC CE which contains buffer status up to (and including) the last event that triggered a SL BSR associated with the destination ID or the Link ID prior to the MAC PDU assembly.

All pending SR(s) associated with the destination ID or the Link ID shall be cancelled and each respective sr-ProhibitTimer associated with the destination or the Link ID shall be stopped if one of the following events occurs:

- when the serving BS reconfigures SL transmission from SL Mode 1 (BS controlled resource allocation) to SL Mode 2 (UE autonomous resource allocation) for the destination ID or the Link ID to the first UE;
- when the direct link connection is released;
- when the first UE detects link failure on the direct link connection;
- when the first UE receives link failure information from the second UE (e.g. if the second UE informs the first UE about the link failure information indicating a radio link failure (RLF), retransmission failure, security failure and/or reconfiguration failure based on transmission from the first UE);
- when the first UE detects that QoS requirement cannot be guaranteed for the destination ID nor the link ID (the QoS requirement may include a target data rate, a target delay, a target communication range, and/or a target reliability for the destination or the link ID);
- when a quality of the direct link (e.g., based on CBR measurement in the first UE, or CQI report, or based on SL-RSRP or SL-RSRQ measurement report from the second UE) on the direct link is lower than a threshold;
- when the first UE cannot detect transmission from any receiving UE for the destination ID or the link ID;
- when the MAC entity has no data available for transmission for any of the sidelink logical channels associated with the destination ID or the Link ID;
- when a Sidelink BSR associated with the destination ID or the Link ID (except for Truncated Sidelink BSR) is included in a MAC PDU for UL transmission;
- when the remaining configured SL grant(s) valid for the destination ID or the Link ID can accommodate all pending data available for SL transmission associated with the destination ID or the Link ID;
- when the SL grant(s) can accommodate all pending data available for transmission for the destination ID or the Link ID; and/or
- when the UE changes a PCell or a PSCell e.g., due to handover or cell selection.

Only PUCCH resources on a BWP which is active at the time of SR transmission occasion maybe considered valid.

As long as at least one SR is pending, for each pending SR:

1> if the MAC entity has no valid PUCCH resource configured for the pending SR, the UE shall initiate a Random Access procedure on the SpCell and cancel the pending SR;

1> Else, for the SR configuration corresponding to the pending SR associated with a highest priority of sidelink logical channels of the destination ID or the link ID below a threshold indicated by the BS or determined by a pre-configuration, when the MAC entity has an SR transmission occasion on the valid PUCCH resource for SR configured, and if sr-ProhibitTimer is not running at the time of the SR transmission occasion, and if the PUCCH resource for the SR transmission occasion does not overlap with a measurement gap; and if the PUCCH resource for the SR transmission occasion does not overlap with a UL-SCH resource:

2> if SR_COUNTER<sr-TransMax, the UE shall increment SR_COUNTER by 1, instruct the physical layer to signal the SR on one valid PUCCH resource for SR, and start the sr-ProhibitTimer.

2> Else (i.e., SR_COUNTER≥sr-TransMax): the UE shall notify RRC to release PUCCH for all Serving Cells, notify RRC to release SRS for all Serving Cells, clear any configured downlink assignments and uplink grants, clear any PUSCH resources for semi-persistent CSI reporting and initiate a Random Access procedure on the SpCell and cancel all pending SRs.

The selection of which valid PUCCH resource for SR to signal SR on when the MAC entity has more than one overlapping valid PUCCH resource for the SR transmission occasion may be left to UE implementation.

If more than one individual SR triggers an instruction from the MAC entity to the PHY layer to signal the SR on the same valid PUCCH resource, the SR_COUNTER for the relevant SR configuration may be incremented only once.

The MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and the MAC PDU includes a SL BSR MAC CE which contains buffer status up to (and including) the last event that triggered a BSR prior to the MAC PDU assembly, or when the SL grant(s) can accommodate all pending data available for transmission for the destination ID or the link ID.

In step S1411, the first wireless device may transmit the SR and/or the sidelink BSR, to the BS.

In step S1413, upon receiving the SR and/or the sidelink BSR, the serving BS may allocate one or more SL resources to the first UE. The BS may indicate which Link ID and/or destination ID is used for the allocated SL resources. The Link ID and/or the destination ID may indicated to the BS in step S1403.

Alternatively, the first UE may autonomously select one or more SL resources from a resource pool configured by the base station for the Link ID and/or the destination ID. If one, more or all logical channels of the link ID or the destination ID, the UE may select a resource pool with HARQ feedback resources. One, more or all logical channels may correspond to (or, may be associated with/related to) the link ID or the destination ID, and the UE may select a resource pool with HARQ feedback resources. The Link ID and/or the destination may be indicated to the BS in step S1403.

The SL resources can be a configured grant (e.g., semi-persistent scheduling (SPS)) or a SL grant for one or more sidelink transmissions at least for new transmissions (and optionally one or more retransmissions).

The resource pool, the configured grant or the SL grant can be mapped to a source ID/index, a particular link identifier or a destination ID/index.

In step S1415, upon receiving an allocation of the SL resources associated with the destination ID or the Link ID, the first UE shall perform the Logical Channel Prioritization procedure for each SCI (Sidelink Control Information) corresponding to a new transmission and create a MAC PDU associated with each SCI corresponding to a new transmission, as the followings steps A, B and C:

Step A: the UE may select a Link ID (for unicast) and/or a Destination ID (for unicast, groupcast and broadcast), having the sidelink logical channel with the highest priority, among the sidelink logical channels having data available for transmission and having the same transmission format as the one selected corresponding to the Link ID and/or the Destination ID.

Step B: Among the sidelink logical channels belonging to the selected Link ID and/or the selected Destination, and having data available for transmission, the UE may allocate resources to the sidelink logical channel with the highest priority. In this step, the UE may only consider sidelink logical channels which are allowed on the resource pool of the carrier where the SCI is transmitted for V2X sidelink communication, if the resource pool is configured by upper layers, and have a priority whose associated threshCBR-FreqReselection is not lower than the CBR of the resource pool when the resource pool is (re-)selected. The priority may comprise at least one of ProSe per-packet priority (PPPP), ProSe per-packet reliability (PPPR), 5G QoS indicator (5QI), PC5 5QI (PQI) or the QoS parameter.

Step C: if any resources remain, sidelink logical channels belonging to the selected Link ID and/or the selected Destination may be served in decreasing order of priority until either the data for the sidelink logical channel(s) or the SL grant is exhausted, whichever comes first. Sidelink logical channels configured with equal priority should be served equally in the MAC PDU associated with the SCI.

In Logical Channel Prioritization, if the SL resources are configured with HARQ feedback, the UE may select sidelink logical channels only configured with HARQ feedback, or the UE may select a destination ID or a link ID only configured with HARQ feedback. The configuration may be based on a configuration signalled from the network or a pre-configuration.

In step S1417, the first UE may deliver the SL resource and the MAC PDU to a HARQ entity and then perform a new HARQ transmission of a MAC PDU from a HARQ process. There may be a HARQ entity for each Link ID or each destination ID in the first UE. The HARQ entity may have multiple HARQ processes.

In step S1419, if the first UE has a SL grant associated with the destination ID or the link ID for SL retransmission and/or detects a condition for HARQ retransmission in sidelink after the new transmission, the first UE may perform a retransmission of the MAC PDU associated with the destination ID or the link ID.

The condition for HARQ retransmission may comprise at least one of HARQ NACK reception, an expiry of a timer which starts after every HARQ (re-)transmission and stops after completion of all transmissions of the MAC PDU, the case when HARQ ACK is not received for the previous transmission, or the case when the UE does not perform HARQ retransmissions up to the maximum number In step S1421, upon the previous HARQ (re-)transmission of the MAC PDU, transmission of a SR for each SR configuration, reception of SL grant for the previous HARQ (re-)transmission or detection of the condition for HARQ retransmission for the HARQ process, if there is no SL grant associated with the destination ID or the link ID for SL retransmission, the first UE may start a ReTX SR Allowed Timer for the HARQ process for each SR configuration.

Upon reception of HARQ ACK or start of HARQ transmissions of a new MAC PDU for the HARQ process, the first UE may stop the ReTX SR Allowed Timer.

In step S1423, if the first UE detects a condition for HARQ retransmission in sidelink after the new transmission or the previous retransmission of the MAC PDU, if the ReTX SR Allowed Timer is running, and if an SL grant associated with the destination ID or the link ID is not configured for this retransmission, the UE configured for SL Mode 1 for the destination ID or the link ID may trigger a retransmission BSR, and/or a SR for retransmission.

If the retransmission BSR is triggered and if an UL grant is not configured, the Scheduling Request shall be triggered and the retransmission BSR is cancelled.

The SR configuration corresponding to the SR for retransmission may include at least PUCCH resource associated with one of the sidelink logical channels of which SL data is included in the MAC PDU.

If there is no UL grant for the triggered Retransmission BSR or if Retransmission BSR is not configured for the link ID or the destination, the first UE may trigger a SR for retransmission and then transmit the SR on a PUCCH resource for the SR configuration.

If there is a PUCCH resource for this retransmission while the ReTX SR Allowed Timer is running, and if the SR for retransmission has been triggered, the first UE may transmit the SR on the PUCCH resource. But, if a PUCCH resource is overlapped with other transmission, the first UE may skip transmission of this SR on the PUCCH resource.

If there is no PUCCH resource while the ReTX SR Allowed Timer is running, the first UE may skip this retransmission.

If the ReTX SR Allowed Timer is not running and if the SR for retransmission has been triggered, the UE may cancel the triggered SR for retransmission and the first UE skips this retransmission. Alternatively, in this case the UE may autonomously allocate SL resource for retransmission of the MAC PDU within a certain duration, or the UE may stop any retransmission of the MAC PDU and flushes a HARQ buffer for the HARQ process.

Different SR configurations (or different PUCCH resources) can be configured for different numbers of retransmissions of the MAC PDU.

Retransmission BSR may be cancelled after triggering or transmission of the SR for retransmission.

Else if there is a UL grant and Retransmission BSR is configured for the link ID or the destination ID, the first UE may transmit a MAC Control Element (e.g., BSR MAC CE) indicating SL-RNTI and the number of requested retransmissions for request of SL grant(s) for the retransmission(s).

The network or the first UE may configure whether a Retransmission BSR can be triggered for requesting SL resource to SL HARQ retransmission. If this configuration is applied for the first UE, when all triggered Sidelink BSRs associated with the destination or the Link ID are cancelled due to a certain condition, all retransmission BSRs may not be cancelled.

The Retransmission BSR MAC Control Element may indicate SL-RNTI allocated to the first UE or the previous SL grant received for the new transmission or the previous retransmission of the MAC PDU.

In addition, the requested number of HARQ retransmissions can be added in the first or the last field of the Retransmission BSR MAC Control Element.

In step S1425, the BS may allocate SL resources for retransmission. The BS may transmit information for allocating SL resources associated with the destination ID or the link ID for retransmission.

In step S1427, upon allocation of the SL resources associated with the destination ID or the Link ID for retransmission, the first UE may perform retransmission of the MAC PDU.

Figure 15:
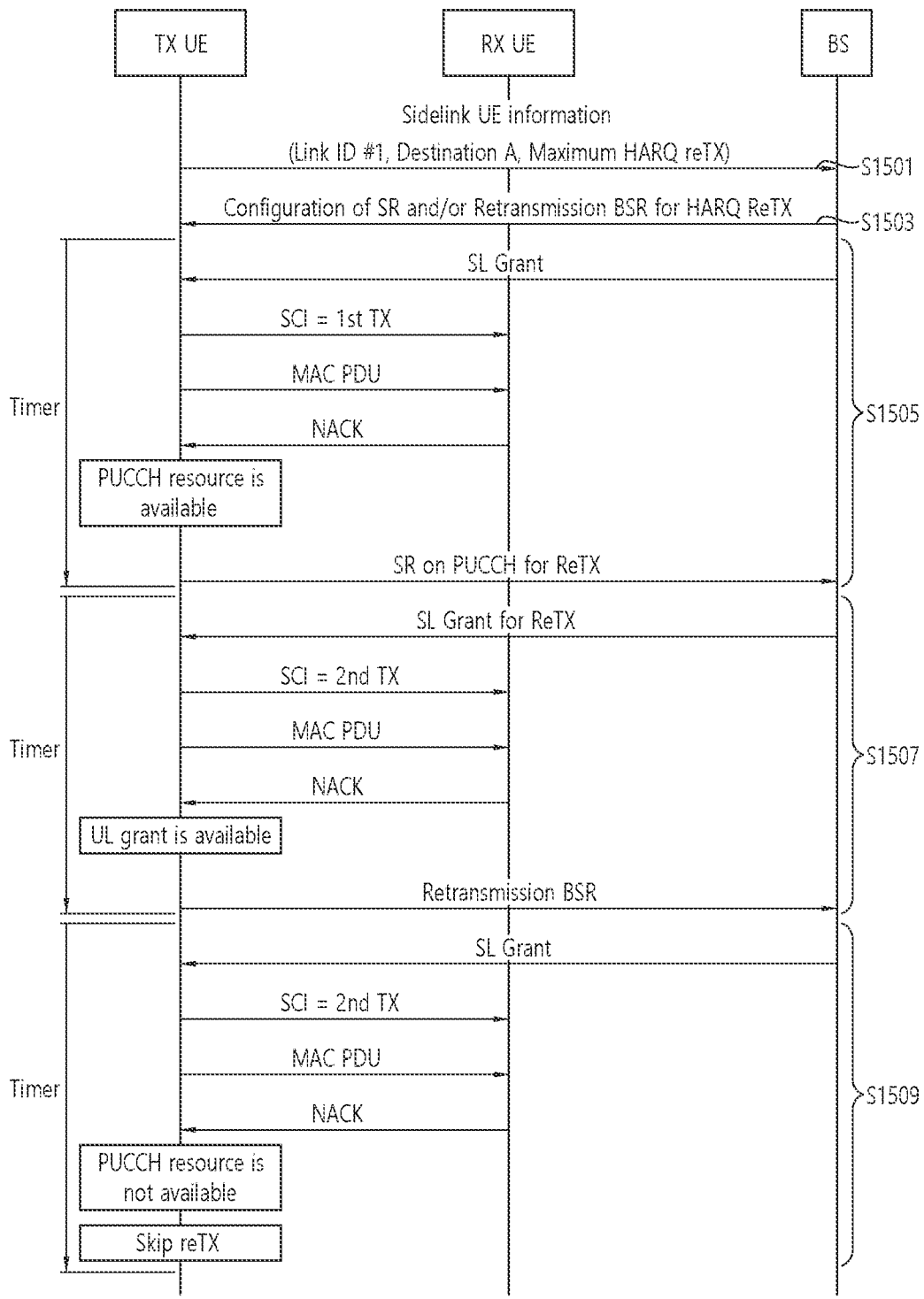
FIG. 15 shows an example of a signal flow for requesting SL resources for retransmission according to an embodiment of the present disclosure.

FIG. 15 shows an example of a signal flow for requesting SL resources for retransmission according to an embodiment of the present disclosure.

Referring to FIG. 15, in step S1501, a transmitting UE (TX UE) may transmit sidelink UE information comprising at least one of i) a link ID for a receiving UE (RX UE) and/or a direct link between the TX UE and the RX UE, ii) one or more destinations including destination A associated with the link ID, or iii) the maximum number of HARQ retransmissions that need to be performed for the link ID.

In step S1503, the TX UE may receive, from a serving BS, a configuration of SR and/or retransmission BSR for HARQ retransmissions.

Step S1505 may be performed when there is no SL resources for SL retransmission, no UL grant for SL BSR transmission, but there is PUCCH resource available for SR transmission after NACK is received for (re)transmission. In step S1505, the TX UE may receive a SL grant from the serving BS. Upon receiving the SL grant, the TX UE may start a timer (e.g., ReTX SR Allowed Timer). The TX UE may transmit, based on the SL grant, SCI indicating an initial transmission (i.e., $1^{st}$ TX) is to be performed and MAC PDU corresponding to the initial transmission. The TX UE may receive NACK for the MAC PDU. If there is no SL resources for SL retransmission, no UL grant for SL BSR transmission, but there is PUCCH resource available for SR transmission, the TX UE may transmit, an SR on the available PUCCH for retransmission, to the serving BS.

Step S1507 may be performed when there is no SL resources for SL retransmission, but there is UL grant available for SL BSR transmission after NACK is received for (re)transmission. In step S1507, the TX UE may receive a SL grant for retransmission from the serving BS. Upon receiving the SL grant, the TX UE may start a timer (e.g., ReTX SR Allowed Timer). The TX UE may transmit, based on the SL grant, SCI indicating a retransmission (i.e., $2^{nd}$ TX) is to be performed and MAC PDU corresponding to the retransmission. The TX UE may receive NACK for the MAC PDU. If there is no SL resources for SL retransmission, but there is UL grant available for SL BSR transmission, the TX UE may transmit, based on the UL grant, a retransmission BSR to the serving BS.

Step S1509 may be performed when there is no SL resources for SL retransmission, no UL grant for SL BSR transmission, and no PUCCH resource for SR transmission after NACK is received for (re)transmission. In step S1509, the TX UE may receive a SL grant for retransmission from the serving BS. Upon receiving the SL grant, the TX UE may start a timer (e.g., ReTX SR Allowed Timer). The TX UE may transmit, based on the SL grant, SCI indicating a retransmission (i.e., $2^{nd}$ TX) is to be performed and MAC PDU corresponding to the retransmission. The TX UE may receive NACK for the MAC PDU. If there is no SL resources for SL retransmission, no UL grant for SL BSR transmission, and no PUCCH resource for SR transmission, the TX UE may skip a retransmission of the MAC PDU.

Figure 16:
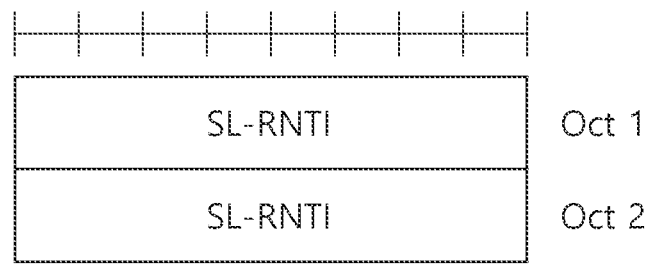
Figure 17:
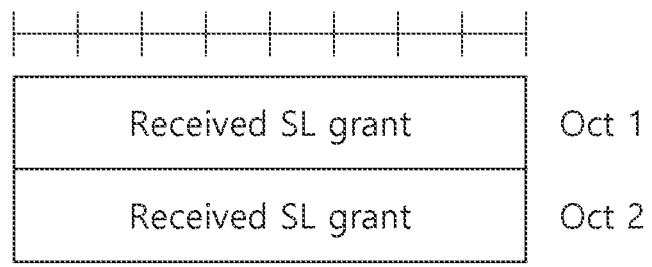

FIGS. 16 to 18 show examples of a structure of retransmission BSR MAC CE according to an embodiment of the present disclosure.

Referring to FIG. 16, the retransmission BSR MAC CE may indicate SL-RNTI allocated to the transmitting UE. Referring to FIG. 17, the retransmission BSR MAC CE may indicate the previous SL grant received for the new transmission or the previous retransmission of the MAC PDU. Referring to FIG. 18, the retransmission BSR MAC CE may indicate the requested number of HARQ retransmissions. The requested number of HARQ retransmission may be added as the first or the last field of the retransmission BSR MAC CE.

Figure 19:
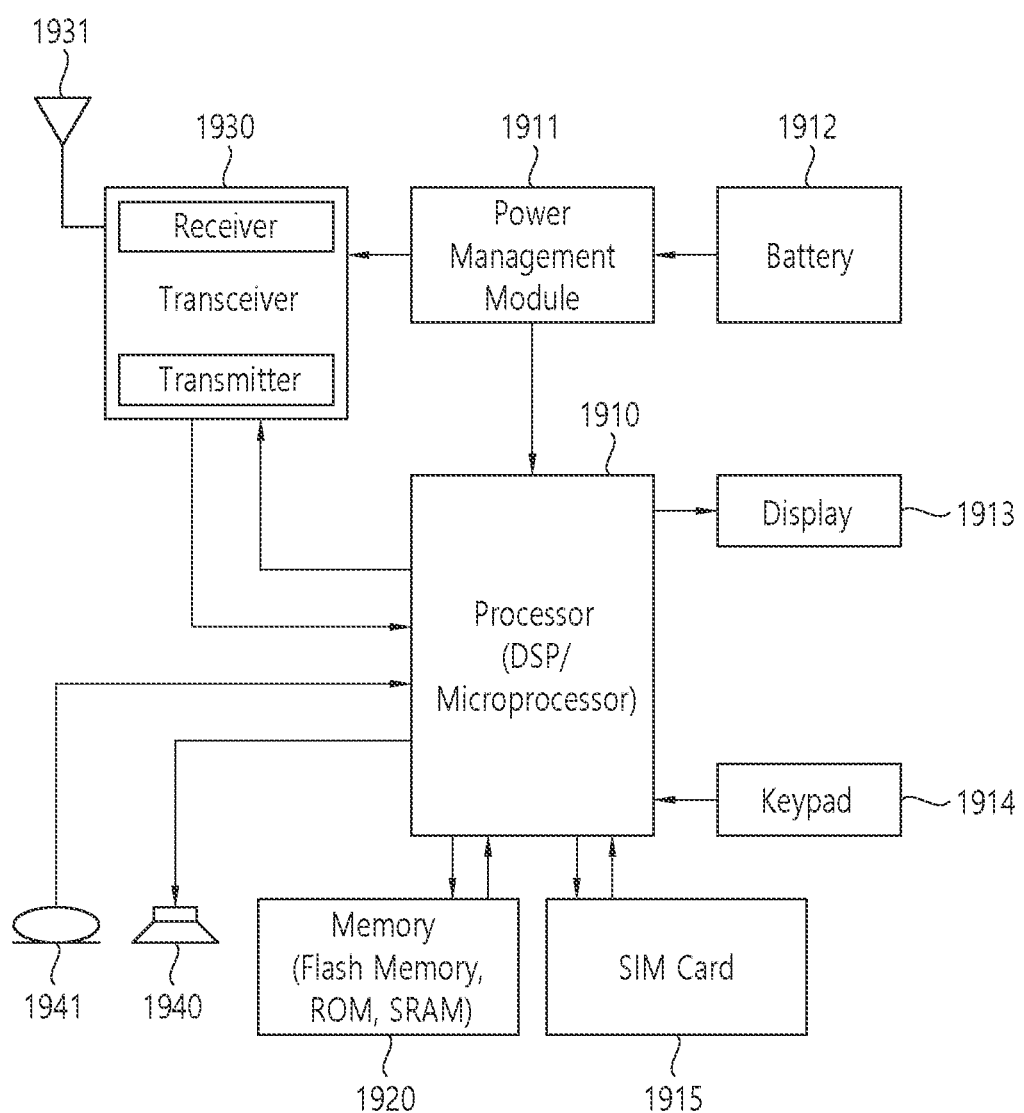
FIG. 19 shows a UE to implement an embodiment of the present disclosure.

FIG. 19 shows a UE to implement an embodiment of the present disclosure. The present disclosure described above for UE side may be applied to this embodiment.

A UE includes a processor 1910, a power management module 1911, a battery 1912, a display 1913, a keypad 1914, a subscriber identification module (SIM) card 1915, a memory 1920, a transceiver 1930, one or more antennas 1931, a speaker 1940, and a microphone 1941.

The processor 1910 may be configured to implement proposed functions, procedures and/or methods described in this description. Layers of the radio interface protocol may be implemented in the processor 1910. The processor 1910 may include application-specific integrated circuit (ASIC), other chipset, logic circuit and/or data processing device. The processor 1910 may be an application processor (AP). The processor 1910 may include at least one of a digital signal processor (DSP), a central processing unit (CPU), a graphics processing unit (GPU), a modem (modulator and demodulator). An example of the processor 1910 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1910 may be configured to, or configured to control the transceiver 1930 to implement steps performed by the UE and/or the wireless device throughout the disclosure.

The power management module 1911 manages power for the processor 1910 and/or the transceiver 1930. The battery 1912 supplies power to the power management module 1911. The display 1913 outputs results processed by the processor 1910. The keypad 1914 receives inputs to be used by the processor 1910. The keypad 1914 may be shown on the display 1913. The SIM card 1915 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1920 is operatively coupled with the processor 1910 and stores a variety of information to operate the processor 1910. The memory 1920 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1920 and executed by the processor 1910. The memory 1920 can be implemented within the processor 1910 or external to the processor 1910 in which case those can be communicatively coupled to the processor 1910 via various means as is known in the art.

The transceiver 1930 is operatively coupled with the processor 1910, and transmits and/or receives a radio signal. The transceiver 1930 includes a transmitter and a receiver. The transceiver 1930 may include baseband circuitry to process radio frequency signals. The transceiver 1930 controls the one or more antennas 1931 to transmit and/or receive a radio signal.

The speaker 1940 outputs sound-related results processed by the processor 1910. The microphone 1941 receives sound-related inputs to be used by the processor 1910.

Figure 20:
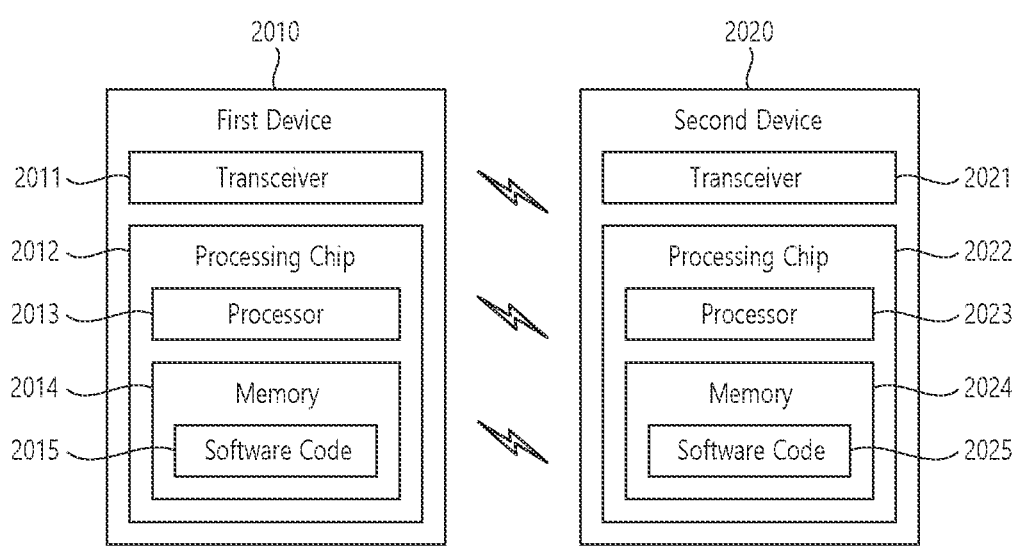
FIG. 20 shows another example of a wireless communication system to which the technical features of the present disclosure can be applied.

FIG. 20 shows another example of a wireless communication system to which the technical features of the present disclosure can be applied.

Referring to FIG. 20, the wireless communication system may include a first device 2010 (i.e., first device 210) and a second device 2020 (i.e., second device 220).

The first device 2010 may include at least one transceiver, such as a transceiver 2011, and at least one processing chip, such as a processing chip 2012. The processing chip 2012 may include at least one processor, such a processor 2013, and at least one memory, such as a memory 2014. The memory may be operably connectable to the processor 2013. The memory 2014 may store various types of information and/or instructions. The memory 2014 may store a software code 2015 which implements instructions that, when executed by the processor 2013, perform operations of the first device 910 described throughout the disclosure. For example, the software code 2015 may implement instructions that, when executed by the processor 2013, perform the functions, procedures, and/or methods of the first device 2010 described throughout the disclosure. For example, the software code 2015 may control the processor 2013 to perform one or more protocols. For example, the software code 2015 may control the processor 2013 to perform one or more layers of the radio interface protocol.

The second device 2020 may include at least one transceiver, such as a transceiver 2021, and at least one processing chip, such as a processing chip 2022. The processing chip 2022 may include at least one processor, such a processor 2023, and at least one memory, such as a memory 2024. The memory may be operably connectable to the processor 2023. The memory 2024 may store various types of information and/or instructions. The memory 2024 may store a software code 2025 which implements instructions that, when executed by the processor 2023, perform operations of the second device 2020 described throughout the disclosure. For example, the software code 2025 may implement instructions that, when executed by the processor 2023, perform the functions, procedures, and/or methods of the second device 2020 described throughout the disclosure. For example, the software code 2025 may control the processor 2023 to perform one or more protocols. For example, the software code 2025 may control the processor 2023 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 21:
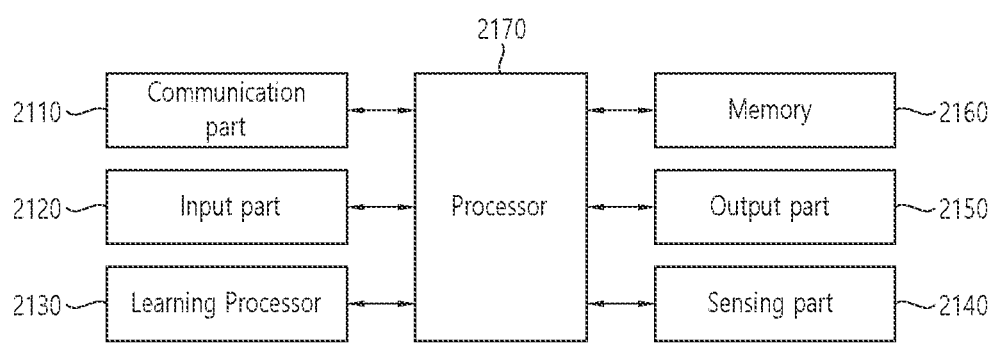
FIG. 21 shows an example of an AI device to which the technical features of the present disclosure can be applied.

FIG. 21 shows an example of an AI device to which the technical features of the present disclosure can be applied.

The AI device 2100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 21, the AI device 2100 may include a communication part 2110, an input part 2120, a learning processor 2130, a sensing part 2140, an output part 2150, a memory 2160, and a processor 2170.

The communication part 2110 can transmit and/or receive data to and/or from external devices such as the AI devices and the AI server using wire and/or wireless communication technology. For example, the communication part 2110 can transmit and/or receive sensor information, a user input, a learning model, and a control signal with external devices. The communication technology used by the communication part 2110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 2120 can acquire various kinds of data. The input part 2120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 2120 can acquire input data to be used when acquiring an output using learning data and a learning model for model learning. The input part 2120 may obtain raw input data, in which case the processor 2170 or the learning processor 2130 may extract input features by preprocessing the input data.

The learning processor 2130 may learn a model composed of an ANN using learning data. The learned ANN can be referred to as a learning model. The learning model can be used to infer result values for new input data rather than learning data, and the inferred values can be used as a basis for determining which actions to perform. The learning processor 2130 may perform AI processing together with the learning processor of the AI server. The learning processor 2130 may include a memory integrated and/or implemented in the AI device 2100. Alternatively, the learning processor 2130 may be implemented using the memory 2160, an external memory directly coupled to the AI device 2100, and/or a memory maintained in an external device.

The sensing part 2140 may acquire at least one of internal information of the AI device 2100, environment information of the AI device 2100, and/or the user information using various sensors. The sensors included in the sensing part 2140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 2150 may generate an output related to visual, auditory, tactile, etc. The output part 2150 may include a display unit for outputting visual information, a speaker for outputting auditory information, and/or a haptic module for outputting tactile information.

The memory 2160 may store data that supports various functions of the AI device 2100. For example, the memory 2160 may store input data acquired by the input part 2120, learning data, a learning model, a learning history, etc.

The processor 2170 may determine at least one executable operation of the AI device 2100 based on information determined and/or generated using a data analysis algorithm and/or a machine learning algorithm. The processor 2170 may then control the components of the AI device 2100 to perform the determined operation. The processor 2170 may request, retrieve, receive, and/or utilize data in the learning processor 2130 and/or the memory 2160, and may control the components of the AI device 2100 to execute the predicted operation and/or the operation determined to be desirable among the at least one executable operation. The processor 2170 may generate a control signal for controlling the external device, and may transmit the generated control signal to the external device, when the external device needs to be linked to perform the determined operation. The processor 2170 may obtain the intention information for the user input and determine the user's requirements based on the obtained intention information. The processor 2170 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 2130 and/or learned by the learning processor of the AI server, and/or learned by their distributed processing. The processor 2170 may collect history information including the operation contents of the AI device 2100 and/or the user's feedback on the operation, etc. The processor 2170 may store the collected history information in the memory 2160 and/or the learning processor 2130, and/or transmit to an external device such as the AI server. The collected history information can be used to update the learning model. The processor 2170 may control at least some of the components of AI device 2100 to drive an application program stored in memory 2160. Furthermore, the processor 2170 may operate two or more of the components included in the AI device 2100 in combination with each other for driving the application program.

Figure 22:
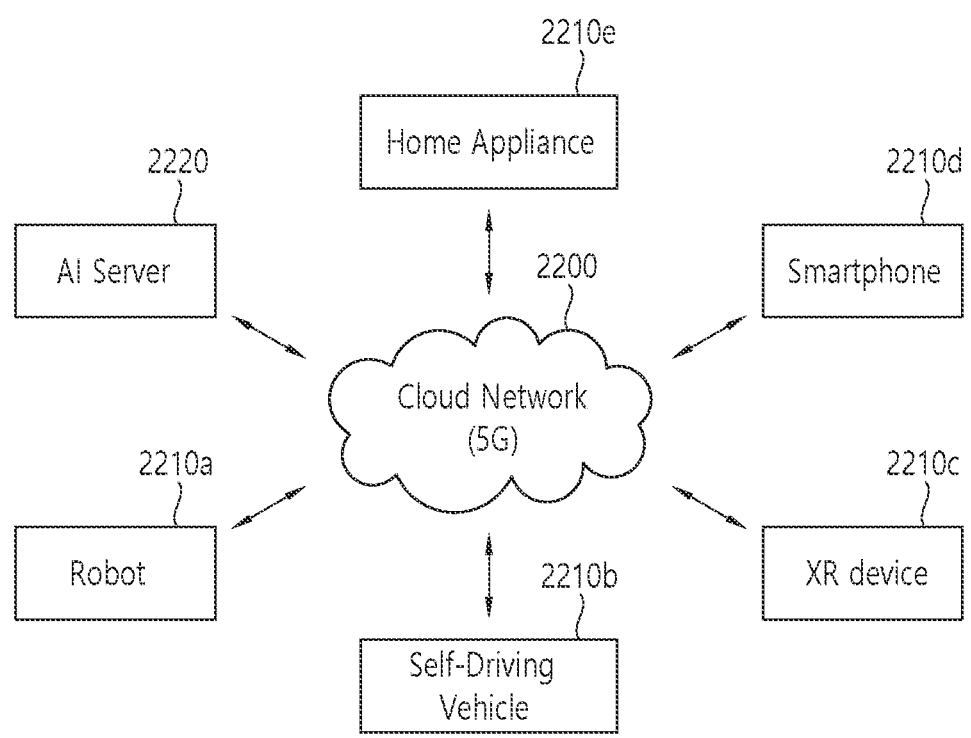
FIG. 22 shows an example of an AI system to which the technical features of the present disclosure can be applied.

FIG. 22 shows an example of an AI system to which the technical features of the present disclosure can be applied.

Referring to FIG. 22, in the AI system, at least one of an AI server 2220, a robot 2210a, an autonomous vehicle 2210b, an XR device 2210c, a smartphone 2210d and/or a home appliance 2210e is connected to a cloud network 2200. The robot 2210a, the autonomous vehicle 2210b, the XR device 2210c, the smartphone 2210d, and/or the home appliance 2210e to which the AI technology is applied may be referred to as AI devices 2210a to 2210e.

The cloud network 2200 may refer to a network that forms part of a cloud computing infrastructure and/or resides in a cloud computing infrastructure. The cloud network 2200 may be configured using a 3G network, a 4G or LTE network, and/or a 5G network. That is, each of the devices 2210a to 2210e and 2220 consisting the AI system may be connected to each other through the cloud network 2200. In particular, each of the devices 2210a to 2210e and 2220 may communicate with each other through a base station, but may directly communicate with each other without using a base station.

The AI server 2220 may include a server for performing AI processing and a server for performing operations on big data. The AI server 2220 is connected to at least one or more of AI devices constituting the AI system, i.e. the robot 2210a, the autonomous vehicle 2210b, the XR device 2210c, the smartphone 2210d and/or the home appliance 2210e through the cloud network 2200, and may assist at least some AI processing of the connected AI devices 2210a to 2210e. The AI server 2220 can learn the ANN according to the machine learning algorithm on behalf of the AI devices 2210a to 2210e, and can directly store the learning models and/or transmit them to the AI devices 2210a to 2210e. The AI server 2220 may receive the input data from the AI devices 2210a to 2210e, infer the result value with respect to the received input data using the learning model, generate a response and/or a control command based on the inferred result value, and transmit the generated data to the AI devices 2210a to 2210e. Alternatively, the AI devices 2210a to 2210e may directly infer a result value for the input data using a learning model, and generate a response and/or a control command based on the inferred result value.

Various embodiments of the AI devices 2210a to 2210e to which the technical features of the present disclosure can be applied will be described. The AI devices 2210a to 2210e shown in FIG. 22 can be seen as specific embodiments of the AI device 2100 shown in FIG. 21.

The present disclosure can have various advantageous effects.

For example, a UE may identify control information transmissions with different identifiers for a direct link with the other UE, in particular when the UE is connected to the other UE for multiple services. Therefore, it is beneficial in that the system can manage a direct link between two UEs performing sidelink communication for multiple services.

For example, by generating a data unit comprising sidelink data having similar QoS characteristics configured with HARQ feedback, SL transmission can be optimized.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a user equipment (UE) in a wireless communication system, the method comprising:
   obtaining a sidelink (SL) grant;
   identifying logical channels including one or more first logical channels configured with hybrid automatic repeat request (HARQ) feedback, and one or more second logical channels not configured with HARQ feedback;
   selecting the one or more first logical channels based on a feedback resource configured for the SL grant, wherein the one or more second logical channels are not selected among the logical channels;
   creating a media access control (MAC) protocol data unit (PDU) including the one or more first logical channels, wherein the MAC PDU does not include the one or more second logical channels;
   transmitting the MAC PDU based on the SL grant;
   receiving a negative acknowledgement (NACK) for the transmission of the MAC PDU; and
   transmitting, to a network, a buffer status report (BSR) comprising information about an amount of SL data available for transmission for the one or more first logical channels,
   wherein the BSR is prioritized over uplink (UL) data, and
   wherein the BSR is prioritized based on a value of a highest priority of the one or more first logical channels being lower than a threshold.

2. The method of claim 1, further comprising:
   starting a timer upon receiving the SL grant,
   wherein the timer corresponds to a time period during which a transmission of a scheduling request (SR) for requesting an uplink (UL) grant for a retransmission buffer status report (BSR) is allowed, and
   wherein the retransmission BSR indicates an amount of SL data available for a retransmission in a SL buffer of the UE.

3. The method of claim 2, further comprising:
   after receiving the NACK, identifying that SL resources for a retransmission of the MAC PDU and the UL grant for the retransmission BSR are unavailable, and a physical uplink control channel (PUCCH) resource for the SR is available while the timer is running; and
   transmitting, to a network, the SR for requesting the UL grant for the retransmission BSR, on the PUCCH resource.

4. The method of claim 3, wherein the SR is not transmitted on the PUCCH resource based on the PUCCH resource being overlapped with other transmissions.

5. The method of claim 2, further comprising:
   after receiving the NACK, identifying that SL resources for a retransmission of the MAC PDU, the UL grant for the retransmission BSR, and a physical uplink control channel (PUCCH) resource for the SR are unavailable while the timer is running; and
   skipping the retransmission of the MAC PDU.

6. The method of claim 2, further comprising:
   after receiving the NACK, identifying that SL resources for a retransmission of the MAC PDU is unavailable and the UL grant for the retransmission BSR is available while the timer is running; and
   transmitting, to a network based on the UL grant, the retransmission BSR for requesting the SL resources for the retransmission.

7. The method of claim 6, further comprising:
   receiving, from the network, the SL resources for the retransmission; and
   performing the retransmission of the MAC PDU based on the SL resources.

8. The method of claim 2, wherein a priority of the retransmission BSR is higher than that of UL data in the UL grant based on the value of the highest priority of the one or more first logical channels being lower than the threshold, and
   wherein a priority of the retransmission BSR is lower than that of the UL data in the UL grant based on the highest priority of the one or more first logical channels being higher than or equal to the threshold.

9. The method of claim 8, wherein the threshold is configured or signalled from a network to the UE via at least one of downlink control information (DCI), MAC control element (MAC CE), or a radio resource control (RRC) signalling.

10. The method of claim 2, wherein the retransmission BSR indicates SL-radio network temporary identifier (RNTI) allocated to the UE.

11. The method of claim 2, wherein the retransmission BSR indicates previous SL resources received for a new transmission or a previous retransmission.

12. The method of claim 2, wherein the retransmission BSR indicates a requested number of HARQ retransmissions.

13. The method of claim 1, wherein the UE is in communication with at least one of a network, or autonomous vehicles other than the UE.

14. A first wireless device configured to operate in a wireless communication system, the first wireless device comprising:
a transceiver;
a memory; and
at least one processor operatively coupled to the transceiver and the memory,
wherein the memory stores instructions that, based on being executed by the at least one processor, perform operations comprising:
obtaining a sidelink (SL) grant;
identifying logical channels including one or more first logical channels configured with hybrid automatic repeat request (HARQ) feedback, and one or more second logical channels not configured with HARQ feedback;
selecting the one or more first logical channels based on a feedback resource configured for the SL grant, wherein the one or more second logical channels are not selected among the logical channels;
creating a media access control (MAC) protocol data unit (PDU) including the one or more first logical channels, wherein the MAC PDU does not include the one or more second logical channels;
transmitting the MAC PDU based on the SL grant;
receiving a negative acknowledgement (NACK) for the transmission of the MAC PDU; and
transmitting, to a network, a buffer status report (BSR) comprising information about an amount of SL data available for transmission for the one or more first logical channels,
wherein the BSR is prioritized over uplink (UL) data, and
wherein the BSR is prioritized based on a value of a highest priority of the one or more first logical channels being lower than a threshold.

15. A processor for a first wireless device in a wireless communication system, wherein the processor executes instructions, which is stored in a memory of the first wireless device, to perform operations comprising:
obtaining a sidelink (SL) grant;
identifying logical channels including one or more first logical channels configured with hybrid automatic repeat request (HARQ) feedback, and one or more second logical channels not configured with HARQ feedback;
selecting the one or more first logical channels based on a feedback resource configured for the SL grant, wherein the one or more second logical channels are not selected among the logical channels;
creating a media access control (MAC) protocol data unit (PDU) including the one or more first logical channels, wherein the MAC PDU does not include the one or more second logical channels;
transmitting the MAC PDU based on the SL grant;
receiving a negative acknowledgement (NACK) for the transmission of the MAC PDU; and
transmitting, to a network, a buffer status report (BSR) comprising information about an amount of SL data available for transmission for the one or more first logical channels,
wherein the BSR is prioritized over uplink (UL) data, and
wherein the BSR is prioritized based on a value of a highest priority of the one or more first logical channels being lower than a threshold.

* * * * *